(12) United States Patent
Bici et al.

(10) Patent No.: US 9,743,105 B2
(45) Date of Patent: *Aug. 22, 2017

(54) METHOD FOR CODING AND AN APPARATUS

(71) Applicant: NOKIA TECHNOLOGIES OY, Espoo (FI)

(72) Inventors: Mehmet Oguz Bici, Tampere (FI); Jani Lainema, Tampere (FI); Kemal Ugur, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/426,822

(22) Filed: Feb. 7, 2017

(65) Prior Publication Data

US 2017/0150174 A1    May 25, 2017

Related U.S. Application Data

(63) Continuation of application No. 13/666,680, filed on Nov. 1, 2012, now Pat. No. 9,571,833.
(Continued)

(51) Int. Cl.
*H04N 19/513*    (2014.01)
*H04N 19/11*    (2014.01)
(Continued)

(52) U.S. Cl.
CPC ......... *H04N 19/521* (2014.11); *H04N 19/176* (2014.11); *H04N 19/182* (2014.11)

(58) Field of Classification Search
CPC ............. H04N 19/52; H04N 19/00684; H04N 19/00703; H04N 19/147; H04N 19/30;
(Continued)

(56) References Cited

U.S. PATENT DOCUMENTS

2004/0234144 A1    11/2004    Sugimoto et al.
2008/0159401 A1    7/2008    Lee et al.
(Continued)

FOREIGN PATENT DOCUMENTS

WO    WO 2011/062392 A2    5/2011
WO    WO 2011 115659 A1    9/2011

OTHER PUBLICATIONS

Bici, O. et al., *Non-CE-13: Simplification of merge mode*, Joint Collaborative Team on Video Coding (JCT-VC) of ITU-T SG16 WP3 and ISO/IEC JTC1/SC29/WG11, 7th Meeting: Geneva, CH, Nov. 21-30, 2011, Document JCTVC-G593; URL: http://wftp3.itu.int/av-arch/jctvc-site/, 13 pages.
(Continued)

*Primary Examiner* — Nathnael Aynalem
(74) *Attorney, Agent, or Firm* — Alston & Bird LLP

(57) ABSTRACT

The invention relates to a method for encoding, a method for decoding, an apparatus, computer program products, an encoder and a decoder for video information. The motion vector for a block in a video image is predicted from a set of motion vector prediction candidates determined based on previously-coded motion vectors. A motion vector prediction candidate is included in the set based on the location of the block associated with the first spatial motion vector prediction candidate and in comparison with motion vector prediction candidates already in the set.

30 Claims, 13 Drawing Sheets

Related U.S. Application Data

(60) Provisional application No. 61/555,703, filed on Nov. 4, 2011.

(51) Int. Cl.
 *H04N 19/176* (2014.01)
 *H04N 19/182* (2014.01)

(58) Field of Classification Search
 CPC .... H04N 19/597; H04N 19/105; H04N 19/11;
  H04N 19/119; H04N 19/174; H04N
  19/176; H04N 19/187; H04N 19/513;
  H04N 19/58; H04N 19/70
 USPC ..................................... 375/240.01–240.29
 See application file for complete search history.

(56) References Cited

U.S. PATENT DOCUMENTS

| | | | |
|---|---|---|---|
| 2011/0170602 A1 | 7/2011 | Lee et al. | |
| 2011/0176013 A1* | 7/2011 | Robertson | H04N 5/145 348/208.4 |
| 2011/0182362 A1 | 7/2011 | Kim et al. | |
| 2012/0230408 A1* | 9/2012 | Zhou | H04N 19/105 375/240.15 |
| 2012/0257678 A1* | 10/2012 | Zhou | H04N 19/52 375/240.16 |
| 2012/0269270 A1* | 10/2012 | Chen | H04N 19/597 375/240.16 |
| 2012/0300846 A1* | 11/2012 | Sugio | H04N 19/521 375/240.16 |
| 2012/0307905 A1 | 12/2012 | Kim et al. | |
| 2012/0320984 A1* | 12/2012 | Zhou | H04N 19/50 375/240.16 |
| 2013/0003850 A1* | 1/2013 | Sugio | H04N 19/105 375/240.16 |
| 2013/0004092 A1* | 1/2013 | Sasai | H04N 19/70 382/233 |
| 2013/0070855 A1* | 3/2013 | Zheng | H04N 19/105 375/240.16 |
| 2013/0083853 A1* | 4/2013 | Coban | H04N 19/563 375/240.16 |
| 2013/0272408 A1* | 10/2013 | Chen | H04N 19/597 375/240.16 |

OTHER PUBLICATIONS

Bross, B. et al., *Core Experiment 9: MV Coding and Skip/Merge Operations*, Joint Collaborative Team on Video Coding (JCT-VC) of ITU-T SG16 WP3 and ISO/IEC JTC1/SC29/WG11, 6th Meeting, Torino, IT, Jul. 14-22, 2011; Document JCTVC-F909, 13 pages.

Bross, Benjamin, et al.; "*WD4: Working Draft 4 of High-Efficiency Video Coding*", Joint Collaborative Team on Video Coding (JCT-VC) of ITU-T SG16 WP3 and ISO/IEC JTC1/SC29/WG11; 6th Meeting; Torino, IT; Jul. 14-22, 2011; Document JCTVC-F803_d; 232 pages.

Han, Woo-Jin, et al.; "*Improved Video Compression Efficiency Through Flexible Unit Representation and Corresponding Extension of Coding Tools*"; Circuits and Systems for Video Technology; IEEE Transaction on Dec. 20, 2010; 1709-1720.

Huang, Ai-Mei et al., *A multistage motion vector processing method for motion-compensated frame interpolation*, Image Processing, IEEE Transactions on May 17, 2008 694-708.

J.-L. Lin, Y.-W. Chen, Y.-W. Huang, S. Lei; "*CE9: Results of Experiment ROB04*"; JCT-VC Doc. JCTVC-F052, Turin; Jul. 2011.

Jeon, Y. et al., *On MVP list pruning process*, Joint Collaborative Team on Video Coding (JCT-VC) of ITU-T SG16 WP3 and ISO/IEC JTC1/SC29/WG11, 6th Meeting, Torino, IT, Jul. 14-22, 2011, Document JCTVC-F105, 7 pages.

Nakamura, H. et al., *Unification of derivation process for merge mode and MVP*, Joint Collaborative Team on Video Coding (JCT-VC) of ITU-T SG16 WP3 and ISO/IEC JTC1/SC29/WG11, 6th Meeting; Torino, IT Jul. 14-22, 2011; Document JCTVC-F419; URL: http://wftp3.itu.int/AV-ARCH/JCTVC-SITE/2011_07_F_Torino/, 10 pages.

Oudin, S. et al.; "*Block Merging for Quadtree-Based Video Coding*"; IEEE Int. Conf. on Multimedia and Expo; Jul. 11-15, 2011; 6 pages.

Sullivan, G.J.; "*Overview of the High Efficiency Video Coding (HEVC) Standard*"; IEEE Trans. on Circuits and Systems for Video Technology; vol. 22, No. 12; Dec. 2012; pp. 1649-1668.

Tai, Shen-Chuan, et al.; "*A Multi-Pass True Motion Estimation Scheme with Motion Vector Propagation for Frame Rate Up-Conversion Applications*"; Journal of Display Technology; 4.2 (2008): 188-197.

Wiegand, Tomas, et al.; "*WD3: Working Draft 3 of High-Efficiency Video Coding*";Joint Collaborative Team on Video Coding (JCT-VC) of ITU-T SG16 WP3 and ISO/IEC JTC1/SC29/WG11; 5th Meeting; Geneva, CH, Mar. 16-23, 2011; Document JCTVC-E603; 239 pages.

Zheng, Y. et al., *Merge Candidate Selection in 2N×N, N×2N, and N×N Mode*, Joint Collaborative Team on Video Coding (JCT-VC) of ITU-T SG16 WP3 and ISO/IEC JTC1/SC29/WG11, 6th Meeting, Torino, IT, Jul. 14-22, 2011; Document JCTVC-F302, 6 pages.

International Search Report and Written Opinion from corresponding International Application No. PCT/FI212/051070, dated Mar. 27, 2013.

Office Action from corresponding Korean Patent Application No. 2014-7015093, dated Aug. 21, 2015.

Office Action from corresponding Canadian Patent Application No. 2,854,495, dated Oct. 7, 2015.

Taiwanese Office Action and Search Report from Taiwanese Patent Application No. 101140777 dated Dec. 2, 2015.

Extended European Search Report for corresponding European Application No. 12845839.5 dated Mar. 21, 2016, 10 pages.

Office Action from Korean Patent Application No. 2014-7015093 dated Aug. 22, 2016.

Office Action for Canadian Application No. 2,854,495 dated Sep. 6, 2016.

Office Action for Chinese Application No. 2012800657775 dated Oct. 9, 2016.

Office Action for U.S. Appl. No. 13/666,680 dated Jul. 6, 2015, 25 pages.

Final Office Action for U.S. Appl. No. 13/666,680 dated Mar. 1, 2016, 35 pages.

Advisory Action for U.S. Appl. No. 13/666,680 dated Nov. 7, 2016, 4 pages.

Notice of Allowance for U.S. Appl. No. 13/666,680 dated Sep. 30, 2016, 17 pages.

\* cited by examiner ature of the image in a more compact form, for example at a lower bit rate.
METHOD FOR CODING AND AN APPARATUS

CROSS-REFERENCE TO RELATED APPLICATIONS

This application is a continuation of U.S. application Ser. No. 13/666,680, filed Nov. 1, 2012, which claims priority to U.S. Provisional Application No. 61/555,703, filed Nov. 4, 2011, the entire contents of which are incorporated herein by reference.

TECHNICAL FIELD

There is provided a method for encoding, a method for decoding, an apparatus, computer program products, an encoder and a decoder.

BACKGROUND INFORMATION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section A video codec may comprise an encoder which transforms input video into a compressed representation suitable for storage and/or transmission and a decoder that can uncompress the compressed video representation back into a viewable form, or either one of them. The encoder may discard some information in the original video sequence in order to represent the video in a more compact form, for example at a lower bit rate.

Many hybrid video codecs, operating for example according to the International Telecommunication Union's ITU-T H.263 and H.264 coding standards, encode video information in two phases. In the first phase, pixel values in a certain picture area or "block" are predicted. These pixel values can be predicted, for example, by motion compensation mechanisms, which involve finding and indicating an area in one of the previously encoded video frames (or a later coded video frame) that corresponds closely to the block being coded. Additionally, pixel values can be predicted by spatial mechanisms which involve finding and indicating a spatial region relationship, for example by using pixel values around the block to be coded in a specified manner.

Prediction approaches using image information from a previous (or a later) image can also be called as Inter prediction methods, and prediction approaches using image information within the same image can also be called as Intra prediction methods.

The second phase is one of coding the error between the predicted block of pixels and the original block of pixels. This may be accomplished by transforming the difference in pixel values using a specified transform. This transform may be e.g. a Discrete Cosine Transform (DCT) or a variant thereof. After transforming the difference, the transformed difference may be quantized and entropy encoded.

By varying the fidelity of the quantization process, the encoder can control the balance between the accuracy of the pixel representation, (in other words, the quality of the picture) and the size of the resulting encoded video representation (in other words, the file size or transmission bit rate).

The decoder reconstructs the output video by applying a prediction mechanism similar to that used by the encoder in order to form a predicted representation of the pixel blocks (using the motion or spatial information created by the encoder and stored in the compressed representation of the image) and prediction error decoding (the inverse operation of the prediction error coding to recover the quantized prediction error signal in the spatial domain).

After applying pixel prediction and error decoding processes the decoder combines the prediction and the prediction error signals (the pixel values) to form the output video frame.

The decoder (and encoder) may also apply additional filtering processes in order to improve the quality of the output video before passing it for display and/or storing as a prediction reference for the forthcoming frames in the video sequence.

In some video codecs, such as High Efficiency Video Coding Working Draft 4, video pictures may be divided into coding units (CU) covering the area of a picture. A coding unit consists of one or more prediction units (PU) defining the prediction process for the samples within the coding unit and one or more transform units (TU) defining the prediction error coding process for the samples in the coding unit. A coding unit may consist of a square block of samples with a size selectable from a predefined set of possible coding unit sizes. A coding unit with the maximum allowed size can be named as a largest coding unit (LCU) and the video picture may be divided into non-overlapping largest coding units. A largest coding unit can further be split into a combination of smaller coding units, e.g. by recursively splitting the largest coding unit and resultant coding units. Each resulting coding unit may have at least one prediction unit and at least one transform unit associated with it. Each prediction unit and transform unit can further be split into smaller prediction units and transform units in order to increase granularity of the prediction and prediction error coding processes, respectively. Each prediction unit may have prediction information associated with it defining what kind of a prediction is to be applied for the pixels within that prediction unit (e.g. motion vector information for inter predicted prediction units and intra prediction directionality information for intra predicted prediction units) Similarly, each transform unit may be associated with information describing the prediction error decoding process for samples within the transform unit (including e.g. discrete cosine transform (DCT) coefficient information). It may be signalled at coding unit level whether prediction error coding is applied or not for each coding unit. In the case there is no prediction error residual associated with the coding unit, it can be considered there are no transform units for the coding unit. The division of the image into coding units, and division of coding units into prediction units and transform units may be signalled in the bitstream allowing the decoder to reproduce the intended structure of these units.

In some video codecs, motion information is indicated by motion vectors associated with each motion compensated image block. These motion vectors represent the displacement of the image block in the picture to be coded (in the encoder) or decoded (at the decoder) and the prediction source block in one of the previously coded or decoded images (or pictures). In order to represent motion vectors efficiently, motion vectors may be coded differentially with respect to block specific predicted motion vector. In some video codecs, the predicted motion vectors are created in a predefined way, for example by calculating the median of the encoded or decoded motion vectors of the adjacent blocks.

Another way to create motion vector predictions is to generate a list or a set of candidate predictions from blocks in the current frame and/or co-located or other blocks in temporal reference pictures and signalling the chosen candidate as the motion vector prediction. A spatial motion vector prediction is a prediction obtained only on the basis of information of one or more blocks of the same frame than the current frame whereas temporal motion vector prediction is a prediction obtained on the basis of information of one or more blocks of a frame different from the current frame. It may also be possible to obtain motion vector predictions by combining both spatial and temporal prediction information of one or more encoded blocks. These kinds of motion vector predictions are called as spatio-temporal motion vector predictions.

In addition to predicting the motion vector values, the reference index in the reference picture list can be predicted. The reference index may be predicted from blocks in the current frame and/or co-located or other blocks in a temporal reference picture. Moreover, some high efficiency video codecs employ an additional motion information coding/decoding mechanism, often called merging/merge mode, where all the motion field information, which includes motion vector and corresponding reference picture index for each available reference picture list, may be predicted and used without any modification or correction. Similarly, predicting the motion field information may be carried out using the motion field information of blocks in the current frame and/or co-located or other blocks in temporal reference pictures and the used motion field information is signalled among a list of motion field candidate list filled with motion field information of available blocks in the current frame and/or co-located or other blocks in temporal reference pictures.

In some video codecs the prediction residual after motion compensation is first transformed with a transform kernel (like DCT) and then coded. The reason for this is that often there still exists some correlation among the residual and transform can in many cases help reduce this correlation and provide more efficient coding.

Some video encoders utilize Lagrangian cost functions to find optimal coding modes, e.g. the desired Macroblock mode and associated motion vectors. This kind of cost function uses a weighting factor λ to tie together the (exact or estimated) image distortion due to lossy coding methods and the (exact or estimated) amount of information that is required to represent the pixel values in an image area:

$$C=D+\lambda R \quad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Some video codecs such as hybrid video codecs may generate a list of motion vector predictions (MVP) consisting of motion vectors of spatial adjacent blocks (spatial MVP) and/or motion vectors of blocks in a previously decoded frame (temporal MVP). One of the candidate motion vectors in the list is signalled to be used as the motion vector prediction of the current block. After the list is generated, some of the motion vector prediction candidates may have the same motion information. In this case, the identical motion vector prediction candidates may be removed to reduce redundancy. During the decoding, if the temporal motion vector prediction information is unavailable due to e.g. loss of reference frame, the decoder may not know if the temporal motion vector prediction candidate in the list is to be removed. This may lead to uncertainty for mapping the decoded candidate index to the candidates whose removal decision is based on comparing motion information with the temporal motion vector prediction. As a result, false assignment of motion vector prediction candidates may occur which may lead to degradation in the picture quality and drift of false motion information throughout the decoding process.

SUMMARY

The present invention introduces a method for generating a motion vector prediction list for an image block. In some embodiments video codecs employ in a motion prediction candidate list construction a way to reduce the complexity of the implementation. This can be achieved by performing a limited number of motion information comparisons between candidate pairs to remove the redundant candidates rather than comparing every available candidate pair. The decision of whether comparing two candidates may depend on the order of the candidates to be considered for the list and/or coding/prediction mode and/or location of the blocks associated with the candidates. In some embodiments a video codec employs a merge process for motion information coding and creates a list of motion prediction candidates from which one of the candidates is to be signalled as the motion information for the current coding or prediction unit. The motion prediction candidates may consist of several spatial motion predictions and a temporal motion prediction. The spatial candidates are obtained from the motion information of e.g. spatial neighbour blocks.

According to a first aspect of the present invention there is provided a method comprising:

receiving a block of pixels including a prediction unit;

determining a set of spatial motion vector prediction candidates for the block of pixels; the spatial motion vector prediction candidates being provided with motion information;

selecting a first spatial motion vector prediction candidate from the set of spatial motion vector prediction candidates as a potential spatial motion vector prediction candidate to be included in a merge list for the prediction unit;

determining a subset of spatial motion vector predictions based on the location of the block associated with the first spatial motion vector prediction candidate;

comparing motion information of the first spatial motion vector prediction candidate with motion information of the spatial motion vector prediction candidate in the determined subset of spatial motion vector prediction candidates;

if at least one of the comparisons indicates that the motion vector information of the spatial motion vector prediction candidates correspond with each other, excluding the first spatial motion vector prediction candidate from the merge list.

According to a second aspect of the present invention there is provided a method comprising:

receiving an encoded block of pixels including a prediction unit;

determining a set of spatial motion vector prediction candidates for the encoded block of pixels; the spatial motion vector prediction candidates being provided with motion information;

selecting a first spatial motion vector prediction candidate from the set of spatial motion vector prediction candidates as a potential spatial motion vector prediction candidate to be included in a merge list for the prediction unit;

determining a subset of spatial motion vector predictions based on the location of the block associated with the first spatial motion vector prediction candidate;

comparing motion information of the first spatial motion vector prediction candidate with motion information of another spatial motion vector prediction candidate of the set of spatial motion vector prediction candidates;

if at least one of the comparisons indicates that the motion vector information of the spatial motion vector prediction candidates correspond with each other, excluding the first spatial motion vector prediction candidate from the merge list.

According to a third aspect of the present invention there is provided an apparatus comprising a processor and a memory including computer program code, the memory and the computer program code configured to, with the processor, cause the apparatus to:

receive a block of pixels
including a prediction unit;
determining a set of spatial motion vector prediction candidates for the block of pixels; the spatial motion vector prediction candidates being provided with motion information;

selecting a first spatial motion vector prediction candidate from the set of spatial motion vector prediction candidates as a potential spatial motion vector prediction candidate to be included in a merge list for the prediction unit;

determining a subset of spatial motion vector predictions based on the location of the block associated with the first spatial motion vector prediction candidate;

comparing motion information of the first spatial motion vector prediction candidate with motion information of the spatial motion vector prediction candidate in the determined subset of spatial motion vector prediction candidates;

if at least one the comparisons indicates that the motion vector information of the spatial motion vector prediction candidates correspond with each other, excluding the first spatial motion vector prediction candidate from the merge list.

According to a fourth aspect of the present invention there is provided an apparatus comprising a processor and a memory including computer program code, the memory and the computer program code configured to, with the processor, cause the apparatus to:

receive an encoded block of pixels
including a prediction unit;
determining a set of spatial motion vector prediction candidates for the encoded block of pixels; the spatial motion vector prediction candidates being provided with motion information;

selecting a first spatial motion vector prediction candidate from the set of spatial motion vector prediction candidates as a potential spatial motion vector prediction candidate to be included in a merge list for the prediction unit;

determining a subset of spatial motion vector predictions based on the location of the block associated with the first spatial motion vector prediction candidate;

comparing motion information of the first spatial motion vector prediction candidate with motion information of another spatial motion vector prediction candidate of the set of spatial motion vector prediction candidates;

if at least one of the comparisons indicates that the motion vector information of the spatial motion vector prediction candidates correspond with each other, excluding the first spatial motion vector prediction candidate from the merge list.

According to a fifth aspect of the present invention there is provided a storage medium having stored thereon a computer executable program code for use by an encoder, said program code comprises instructions for:

receiving a block of pixels including a prediction unit;
determining a set of spatial motion vector prediction candidates for the block of pixels;
the spatial motion vector prediction candidates being provided with motion information;

select a first spatial motion vector prediction candidate from the set of spatial motion vector prediction candidates as a potential spatial motion vector prediction candidate to be included in a merge list for the prediction unit;

determine a subset of spatial motion vector predictions based on the location of the block associated with the first spatial motion vector prediction candidate;

compare motion information of the first spatial motion vector prediction candidate with motion information of the spatial motion vector prediction candidate in the determined subset of spatial motion vector prediction candidates;

exclude the first spatial motion vector prediction candidate from the merge list, if at least one of the comparisons indicates that the motion vector information of the spatial motion vector prediction candidates correspond with each other According to a sixth aspect of the present invention there is provided a storage medium having stored thereon a computer executable program code for use by a decoder, said program code comprises instructions for:

receiving an encoded block of pixels including a prediction unit;

determining a set of spatial motion vector prediction candidates for the encoded block of pixels; the spatial motion vector prediction candidates being provided with motion information;

selecting a first spatial motion vector prediction candidate from the set of spatial motion vector prediction candidates as a potential spatial motion vector prediction candidate to be included in a merge list for the prediction unit;

determining a subset of spatial motion vector predictions based on the location of the block associated with the first spatial motion vector prediction candidate;

comparing motion information of the first spatial motion vector prediction candidate with motion information of the spatial motion vector prediction candidate in the determined subset of spatial motion vector prediction candidates;

if at least one of the comparisons indicates that the motion vector information of the spatial motion vector prediction candidates correspond with each other, excluding the first spatial motion vector prediction candidate from the merge list.

According to a seventh aspect of the present invention there is provided an apparatus comprising:

means for receiving a block of pixels including a prediction unit;

means for determining a set of spatial motion vector prediction candidates for the block of pixels; the spatial motion vector prediction candidates being provided with motion information;

selecting a first spatial motion vector prediction candidate from the set of spatial motion vector prediction candidates as a potential spatial motion vector prediction candidate to be included in a merge list for the prediction unit;

determining a subset of spatial motion vector predictions based on the location of the block associated with the first spatial motion vector prediction candidate;

comparing motion information of the first spatial motion vector prediction candidate with motion information of the spatial motion vector prediction candidate in the determined subset of spatial motion vector prediction candidates;

if at least one of the comparisons indicates that the motion vector information of the spatial motion vector prediction candidates correspond with each other, excluding the first spatial motion vector prediction candidate from the merge list.

According to an eighth aspect of the present invention there is provided an apparatus comprising:

means for receiving an encoded block of pixels including a prediction unit;

means for determining a set of spatial motion vector prediction candidates for the encoded block of pixels; the spatial motion vector prediction candidates being provided with motion information;

means for selecting a first spatial motion vector prediction candidate from the set of spatial motion vector prediction candidates as a potential spatial motion vector prediction candidate to be included in a merge list for the prediction unit;

means for determining a subset of spatial motion vector predictions based on the location of the block associated with the first spatial motion vector prediction candidate;

means for comparing motion information of the first spatial motion vector prediction candidate with motion information of the spatial motion vector prediction candidate in the determined subset of spatial motion vector prediction candidates;

means for excluding the first spatial motion vector prediction candidate from the merge list, if at least one of the comparisons indicates that the motion vector information of the spatial motion vector prediction candidates correspond with each other.

DESCRIPTION OF THE DRAWINGS

For better understanding of the present invention, reference will now be made by way of example to the accompanying drawings in which:

FIGS. 5a and 5b show a flow diagram showing the operation of an embodiment of the invention with respect to the encoder as shown in FIG. 4a;

DETAILED DESCRIPTION OF SOME EXAMPLE EMBODIMENTS

Figure 1:
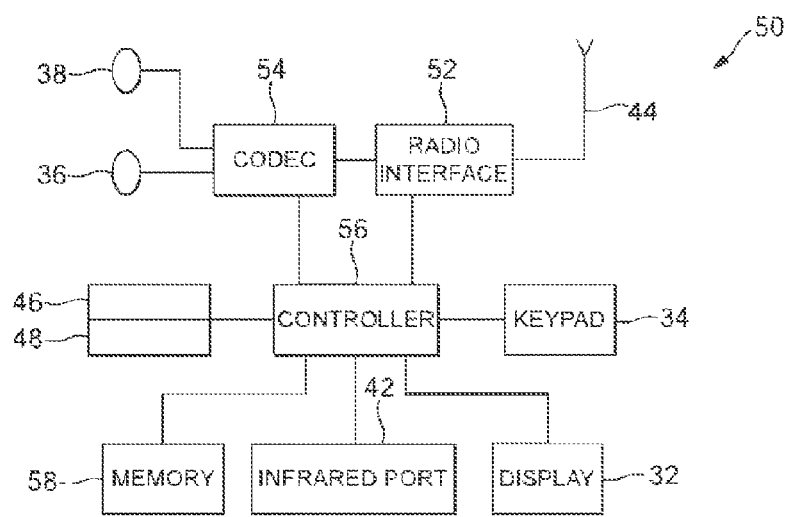
FIG. 1 shows schematically an electronic device employing some embodiments of the invention.
Figure 2:
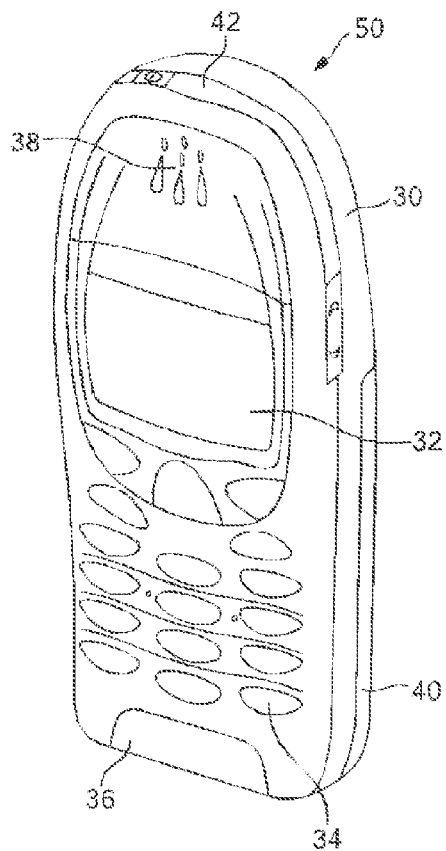
FIG. 2 shows schematically a user equipment suitable for employing some embodiments of the invention.

The following describes in further detail suitable apparatus and possible mechanisms for the provision of improving the prediction accuracy and hence possibly reducing information to be transmitted in video coding systems. In this regard reference is first made to FIG. 1 which shows a schematic block diagram of an exemplary apparatus or electronic device 50, which may incorporate a codec according to an embodiment of the invention.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In some embodiments of the invention, the apparatus may receive the video image data for processing from another device prior to transmission and/or storage. In some embodiments of the invention, the apparatus 50 may receive either wirelessly or by a wired connection the image for coding/decoding.

Figure 3:
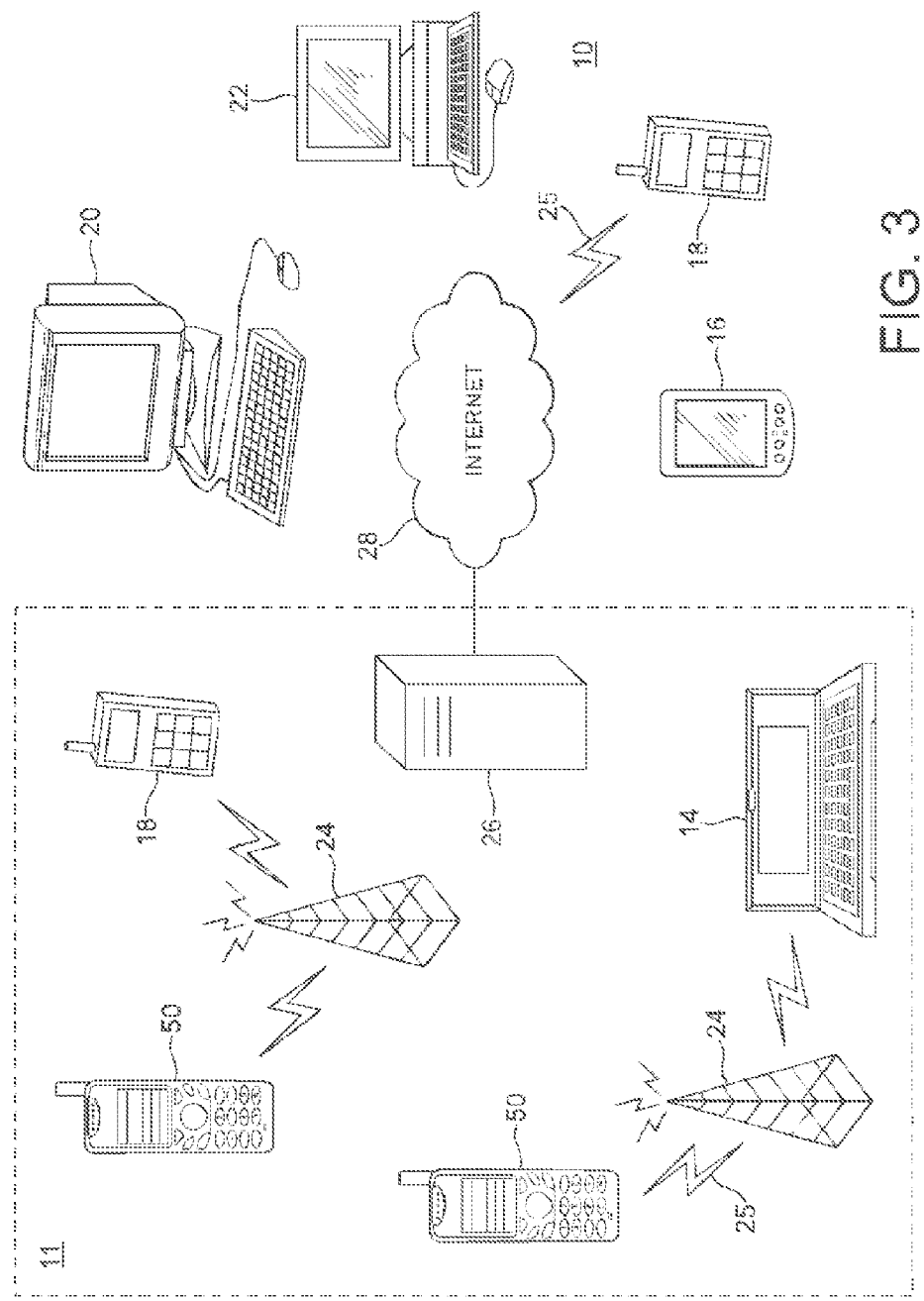
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatuses may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Figure 4A:
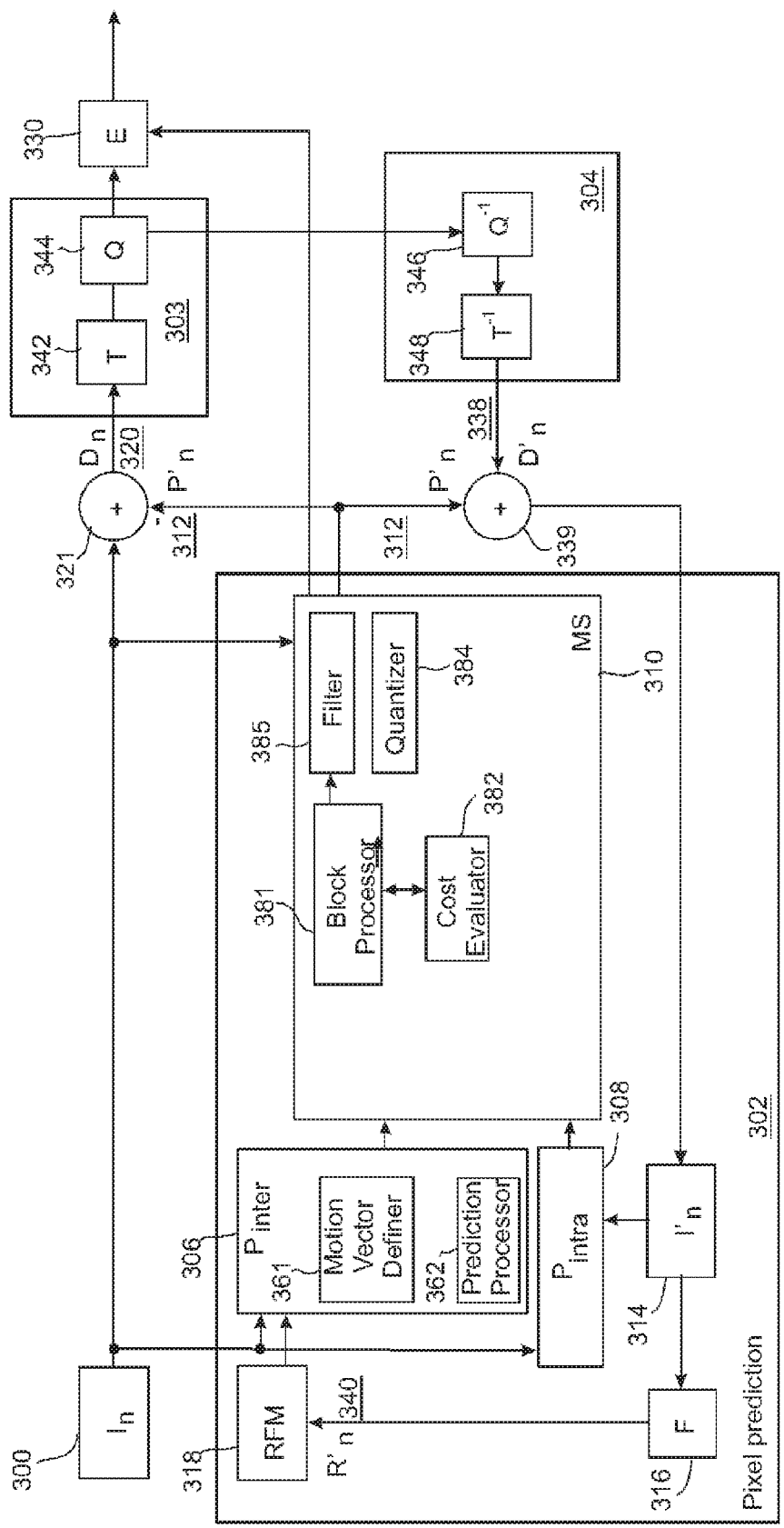
FIG. 4a shows schematically an embodiment of the invention as incorporated within an encoder.

With respect to FIG. 4a, a block diagram of a video encoder suitable for carrying out embodiments of the invention is shown. Furthermore, with respect to FIGS. 5a and 5b, the operation of the encoder exemplifying embodiments of the invention specifically with respect to construction of the list of candidate predictions is shown as a flow diagram.

FIG. 4a shows the encoder as comprising a pixel predictor 302, prediction error encoder 303 and prediction error decoder 304. FIG. 4a also shows an embodiment of the pixel predictor 302 as comprising an inter-predictor 306, an intra-predictor 308, a mode selector 310, a filter 316, and a reference frame memory 318. In this embodiment the mode selector 310 comprises a block processor 381 and a cost evaluator 382. The encoder may further comprise an entropy encoder 330 for entropy encoding the bit stream.

Figure 4B:
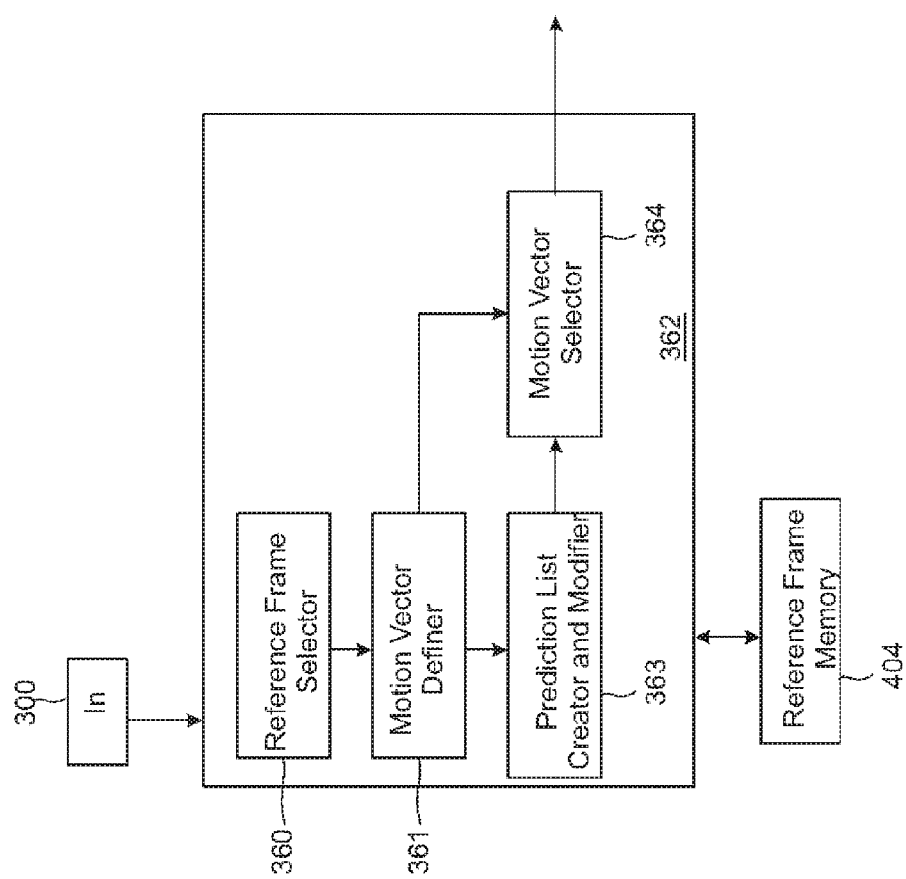
FIG. 4b shows schematically an embodiment of a prediction reference list generation and modification according to some embodiments of the invention.

FIG. 4b depicts an embodiment of the inter predictor 306. The inter predictor 306 comprises a reference frame selector 360 for selecting reference frame or frames, a motion vector definer 361, a prediction list modifier 363 and a motion vector selector 364. These elements or some of them may be part of a prediction processor 362 or they may be implemented by using other means.

The pixel predictor 302 receives the image 300 to be encoded at both the inter-predictor 306 (which determines the difference between the image and a motion compensated reference frame 318) and the intra-predictor 308 (which determines a prediction for an image block based only on the already processed parts of the current frame or picture). The output of both the inter-predictor and the intra-predictor may be passed to the mode selector 310. The intra-predictor 308 may have more than one intra-prediction modes. Hence, each mode may perform the intra-prediction and provide the predicted signal to the mode selector 310. The mode selector 310 also receives a copy of the image 300.

The mode selector 310 determines which encoding mode to use to encode the current block. If the mode selector 310 decides to use an inter-prediction mode it will pass the output of the inter-predictor 306 to the output of the mode selector 310. If the mode selector 310 decides to use an intra-prediction mode it will pass the output of one of the intra-predictor modes to the output of the mode selector 310.

The output of the mode selector is passed to a first summing device 321. The first summing device may subtract the pixel predictor 302 output from the image 300 to produce a first prediction error signal 320 which is input to the prediction error encoder 303.

The pixel predictor 302 further receives from a preliminary reconstructor 339 the combination of the prediction representation of the image block 312 and the output 338 of the prediction error decoder 304. The preliminary reconstructed image 314 may be passed to the intra-predictor 308 and to a filter 316. The filter 316 receiving the preliminary representation may filter the preliminary representation and output a final reconstructed image 340 which may be saved in a reference frame memory 318. The reference frame memory 318 may be connected to the inter-predictor 306 to be used as the reference image against which the future image 300 is compared in inter-prediction operations.

The operation of the pixel predictor 302 may be configured to carry out any known pixel prediction algorithm known in the art.

The pixel predictor 302 may also comprise a filter 385 to filter the predicted values before outputting them from the pixel predictor 302.

The operation of the prediction error encoder 302 and prediction error decoder 304 will be described hereafter in further detail. In the following examples the encoder generates images in terms of 16×16 pixel macroblocks which go to form the full image or picture. Thus, for the following examples the pixel predictor 302 outputs a series of predicted macroblocks of size 16×16 pixels and the first summing device 321 outputs a series of 16×16 pixel residual data macroblocks which may represent the difference between a first macro-block in the image 300 against a predicted macro-block (output of pixel predictor 302). It would be appreciated that other size macro blocks may be used.

The prediction error encoder 303 comprises a transform block 342 and a quantizer 344. The transform block 342 transforms the first prediction error signal 320 to a transform domain. The transform is, for example, the DCT transform. The quantizer 344 quantizes the transform domain signal, e.g. the DCT coefficients, to form quantized coefficients.

The prediction error decoder 304 receives the output from the prediction error encoder 303 and performs the opposite processes of the prediction error encoder 303 to produce a decoded prediction error signal 338 which when combined with the prediction representation of the image block 312 at the second summing device 339 produces the preliminary reconstructed image 314. The prediction error decoder may be considered to comprise a dequantizer 346, which dequantizes the quantized coefficient values, e.g. DCT coefficients, to reconstruct the transform signal and an inverse transformation block 348, which performs the inverse transformation to the reconstructed transform signal wherein the output of the inverse transformation block 348 contains reconstructed block(s). The prediction error decoder may also comprise a macroblock filter (not shown) which may filter the reconstructed macroblock according to further decoded information and filter parameters.

In the following the operation of an example embodiment of the inter predictor 306 will be described in more detail. The inter predictor 306 receives the current block for inter prediction. It is assumed that for the current block there already exists one or more neighbouring blocks which have been encoded and motion vectors have been defined for them. For example, the block on the left side and/or the block above the current block may be such blocks. Spatial motion vector predictions for the current block can be formed e.g. by using the motion vectors of the encoded neighbouring blocks and/or of non-neighbour blocks in the same slice or frame, using linear or non-linear functions of spatial motion vector predictions, using a combination of various spatial motion vector predictors with linear or non-linear operations, or by any other appropriate means that do not make use of temporal reference information. It may also be possible to obtain motion vector predictors by combining both spatial and temporal prediction information of one or more encoded blocks. These kinds of motion vector predictors may also be called as spatio-temporal motion vector predictors.

Reference frames used in encoding the neighbouring blocks have been stored to the reference frame memory 404. The reference frames may be short term references or long term references and each reference frame may have a unique index indicative of the location of the reference frame in the reference frame memory. When a reference frame is no longer used as a reference frame it may be removed from the reference frame memory or marked as a non-reference frame wherein the storage location of that reference frame may be occupied for a new reference frame. In addition to the reference frames of the neighbouring blocks the reference frame selector 360 may also select one or more other frames as potential reference frames and store them to the reference frame memory.

Motion vector information of encoded blocks is also stored into the memory so that the inter predictor 306 is able to retrieve the motion vector information when processing motion vector candidates for the current block.

In some embodiments the motion vectors are stored into one or more lists. For example, motion vectors of uni-directionally predicted frames (e.g. P-frames) may be stored to a list called as list 0. For bi-directionally predicted frames (e.g. B-frames) there may be two lists (list 0 and list 1) and for multi-predicted frames there may be more than two lists. Reference frame indices possibly associated with the motion vectors may also be stored in one or more lists.

In some embodiments there may be two or more motion vector prediction procedures and each procedure may have its own candidate set creation process. In one procedure, only the motion vector values are used. In another procedure, which may be called as a Merge Mode, each candidate element may comprise 1) The information whether 'block was uni-predicted using only list0' or 'block was uni-predicted using only list1' or 'block was bi-predicted using list0 and list1' 2) motion vector value for list0 3) Reference picture index in list0 4) motion vector value for list1 5) Reference picture index list1. Therefore, whenever two prediction candidates are to be compared, not only the motion vector values are compared, but also the five values mentioned above may be compared to determine whether they correspond with each other or not. On the other hand, if any of the comparisons indicate that the prediction candidates do not have equal motion information, no further comparisons need be performed.

The motion vector definer 361 defines candidate motion vectors for the current frame by using one or more of the motion vectors of one or more neighbour blocks and/or other blocks of the current block in the same frame and/or co-located blocks and/or other blocks of the current block in one or more other frames. These candidate motion vectors can be called as a set of candidate predictors or a predictor set. Each candidate predictor thus represents the motion vector of one or more already encoded block. In some embodiments the motion vector of the candidate predictor is set equal to the motion vector of a neighbour block for the same list if the current block and the neighbour block refer to the same reference frames for that list. Also for temporal prediction there may be one or more previously encoded frames wherein motion vectors of a co-located block or other blocks in a previously encoded frame can be selected as candidate predictors for the current block. The temporal motion vector predictor candidate can be generated by any means that make use of the frames other than the current frame.

The candidate motion vectors can also be obtained by using more than one motion vector of one or more other blocks such as neighbour blocks of the current block and/or co-located blocks in one or more other frames. As an example, any combination of the motion vector of the block to the left of the current block, the motion vector of the block above the current block, and the motion vector of the block at the up-right corner of the current block may be used (i.e. the block to the right of the block above the current block). The combination may be a median of the motion vectors or calculated by using other formulas. For example, one or more of the motion vectors to be used in the combination may be scaled by a scaling factor, an offset may be added, and/or a constant motion vector may be added. In some embodiments the combined motion vector is based on both temporal and spatial motion vectors, e.g. the motion vector of one or more of the neighbour block or other block of the current block and the motion vector of a co-located block or other block in another frame.

If a neighbour block does not have any motion vector information a default motion vector such as a zero motion vector may be used instead.

Figure 9:
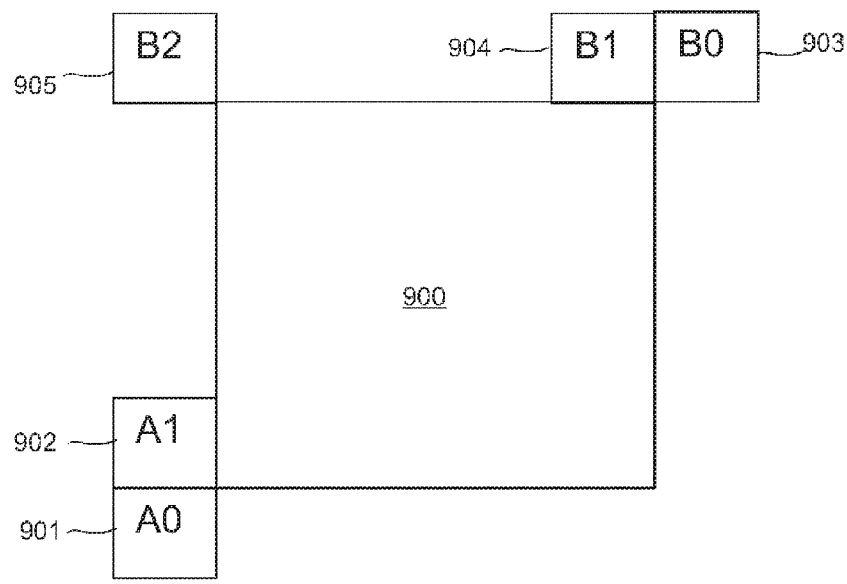
FIG. 9 illustrates an example of a coding unit and some neighbour blocks of the coding unit.

FIG. 9 illustrates an example of a coding unit 900 and some neighbour blocks 901-905 of the coding unit. As can be seen from FIG. 9, if the coding unit 900 represents the current block, the neighbouring blocks 901-905 labelled A0, A1, B0, B1 and B2 could be such neighbour blocks which may be used when obtaining the candidate motion vectors.

Creating additional or extra motion vector predictions based on previously added predictors may be needed when the current number of candidates is limited or insufficient. This kind of creating additional candidates can be performed by combining previous two predictions and/or processing one previous candidate by scaling or adding offset and/or adding a zero motion vector with various reference indices. Hence, the motion vector definer 361 may examine how many motion vector candidates can be defined and how many potential candidate motion vectors exist for the current block. If the number of potential motion vector candidates is smaller than a threshold, the motion vector definer 361 may create additional motion vector predictions.

In some embodiments the combined motion vector can be based on motion vectors in different lists. For example, one motion vector may be defined by combining one motion vector from the list 0 and one motion vector from the list 1 e.g. when the neighbouring or co-located block is a bi-directionally predicted block and there exists one motion vector in the list 0 and one motion vector in the list 1 for the bi-directionally predicted block.

To distinguish the current block from the encoded/decoded blocks the motion vectors of which are used as candidate motion vectors, those encoded/decoded blocks are also called as reference blocks in this application.

In some embodiments not only the motion vector information of the reference block(s) is obtained (e.g. by copying) but also a reference index of the reference block in the reference picture list may be copied to the candidate list. The information whether the block was uni-predicted using only list0 or the block was uni-predicted using only list1 or the block was bi-predicted using list0 and list1 may also be copied. The candidate list may also be called as a candidate set or a set of motion vector prediction candidates.

Figure 6A:
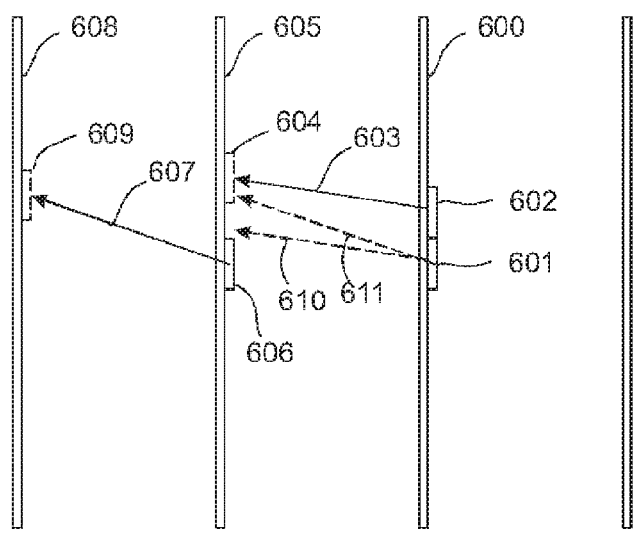
FIG. 6a illustrates an example of spatial and temporal prediction of a prediction unit.

FIG. 6a illustrates an example of spatial and temporal prediction of a prediction unit. There is depicted the current block 601 in the frame 600 and a neighbour block 602 which already has been encoded. The motion vector definer 361 has defined a motion vector 603 for the neighbour block 602 which points to a block 604 in the previous frame 605. This motion vector can be used as a potential spatial motion vector prediction 610 for the current block. FIG. 6a depicts that a co-located block 606 in the previous frame 605, i.e. the block at the same location than the current block but in the previous frame, has a motion vector 607 pointing to a block 609 in another frame 608. This motion vector 607 can be used as a potential temporal motion vector prediction-611 for the current frame.

Figure 6B:
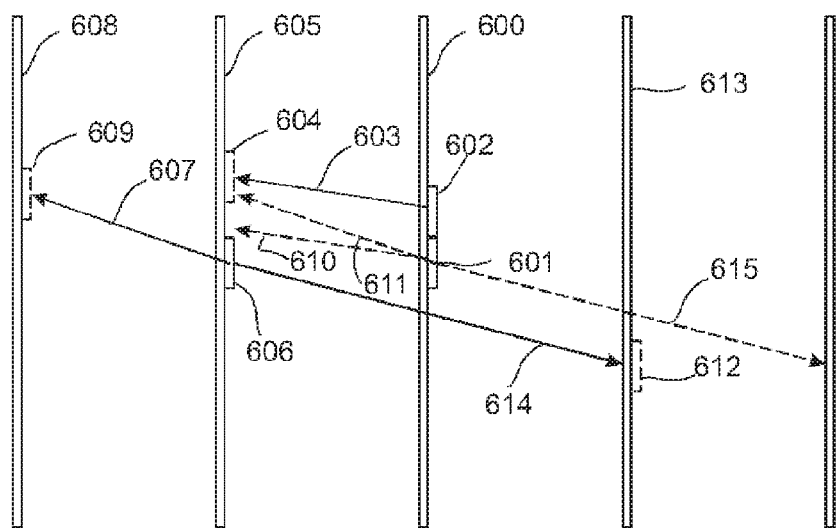
FIG. 6b illustrates another example of spatial and temporal prediction of a prediction unit.

FIG. 6b illustrates another example of spatial and temporal prediction of a prediction unit. In this example the block 606 of the previous frame 605 uses bi-directional prediction based on the block 609 of the frame preceding the frame 605 and on the block 612 succeeding the current frame 600. The temporal motion vector prediction for the current block 601 may be formed by using both the motion vectors 607, 614 or either of them.

Figure 5A:
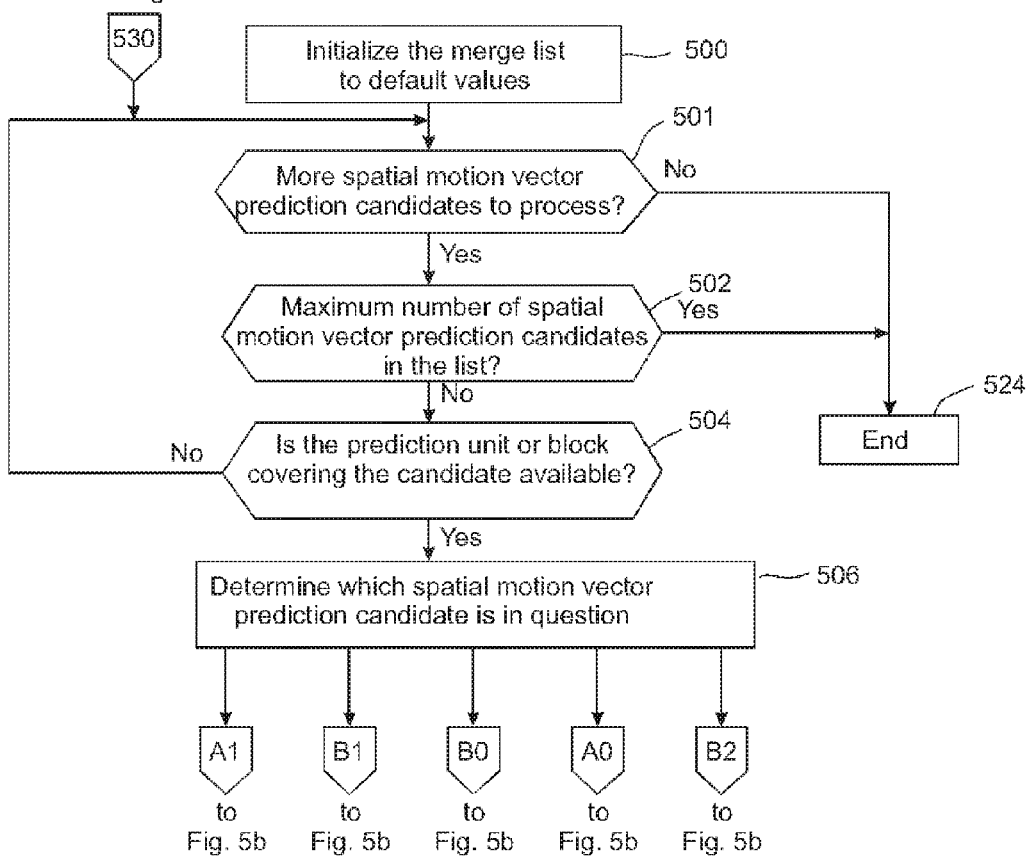
Figure 5B:
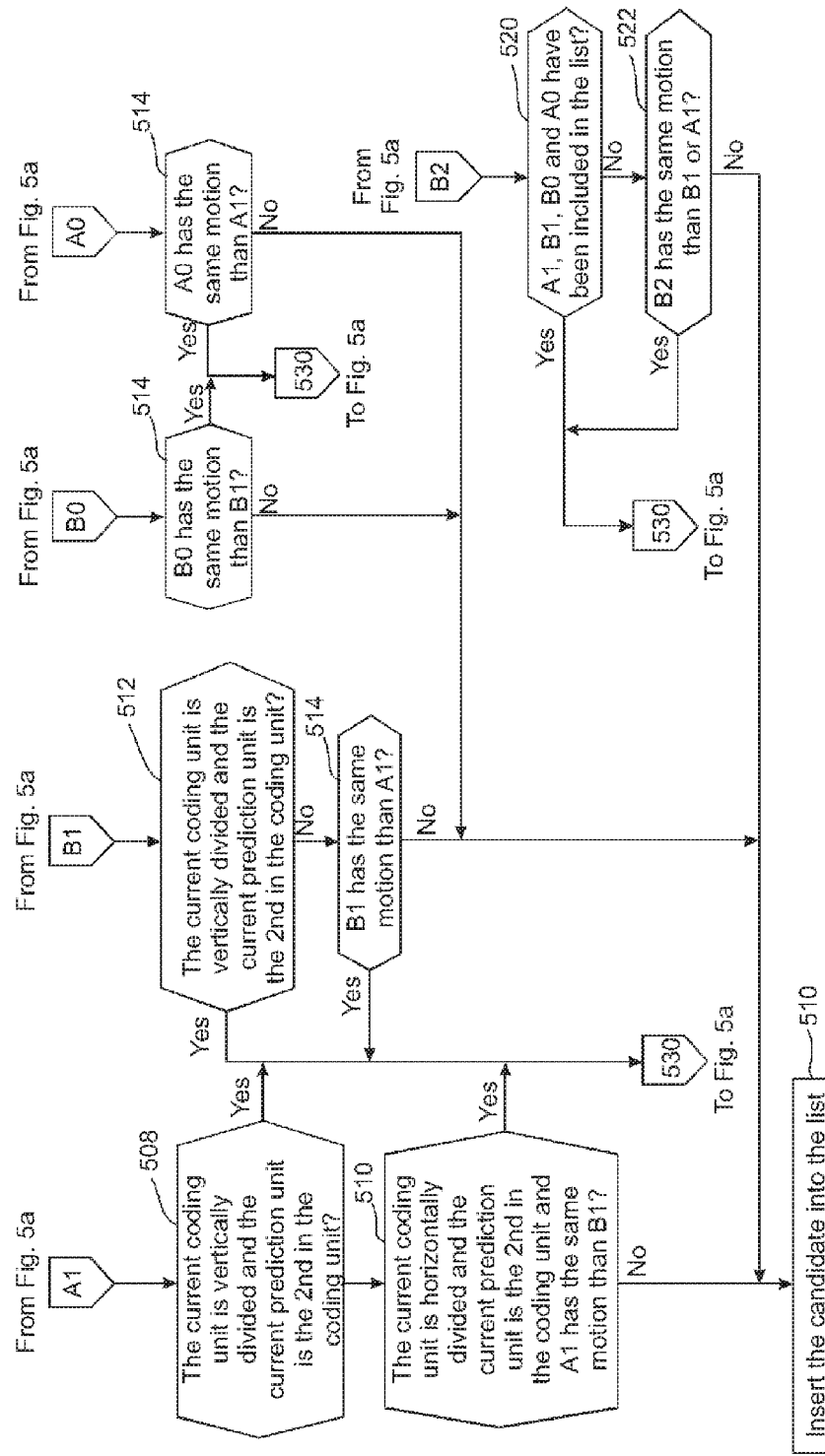

The operation of the prediction list modifier 363 will now be described in more detail with reference to the flow diagram of FIGS. 5a and 5b. The prediction list modifier 363 initializes a motion vector prediction list to default values in block 500 of FIG. 5a. The prediction list modifier 363 may also initialize a list index to an initial value such as zero. Then, in block 501 the prediction list modifier checks whether there are any motion vector candidates to process. If there is at least one motion vector candidate in the predictor set for processing, the prediction list modifier 363 generates the next motion vector candidate which may be a temporal motion vector or a spatial motion vector. The comparison can be an identicality/equivalence check or comparing the (absolute) difference against a threshold or any other similarity metric.

In the following, a merge process for motion information coding according to an example embodiment will be described in more detail. The encoder creates a list of motion prediction candidates from which one of the candidates is to be signalled as the motion information for the current coding unit or prediction unit. The motion prediction candidates may consist of several spatial motion predictions and a temporal motion prediction. The spatial candidates can be obtained from the motion information of e.g. the spatial neighbour blocks A0, A1, B0, B1, B2, whose motion information is used as spatial candidate motion predictions. The temporal motion prediction candidate may be obtained by processing the motion of a block in a frame other than the current frame. In this example embodiment, the encoder operations to construct the merge list for the spatial candidates may include the following. The operations may be carried out by the prediction list modifier 363, for example.

A maximum number of spatial motion prediction candidates to be included in the merge list may be defined. This maximum number may have been stored, for example, to the memory 58 of the apparatus 50, or to another appropriate place. It is also possible to determine the maximum number by using other means, or it may be determined in the software of the encoder of the apparatus 50.

In some embodiments the maximum number of spatial motion prediction candidates to be included in the merge list is four but in some embodiments the maximum number may be less than four or greater than four.

In this example the spatial motion prediction candidates are the spatial neighbour blocks A0, A1, B0, B1, B2. The spatial motion vector prediction candidate A1 is located on the left side of the prediction unit when the encoding/decoding order is from left to right and from top to bottom of the frame, slice or another entity to be encoded/decoded. Respectively, the spatial motion vector prediction candidate B1 is located above the prediction unit. third; the spatial motion vector prediction candidate B0 is on the right side of the spatial motion vector prediction candidate B1; the spatial motion vector prediction candidate A0 is below the spatial motion vector prediction candidate A1; and the spatial motion vector prediction candidate B2 is located on the same column than spatial motion vector prediction candidate A1 and on the same row than the spatial motion vector prediction candidate B1. In other words, the spatial motion vector prediction candidate B2 is cornerwise neighbouring the prediction unit as can be seen e.g. from FIG. 9.

These spatial motion prediction candidates can be processed in a predetermined order, for example, A1, B1, B0, A0 and B2. The first spatial motion prediction candidate to be selected for further examination is thus A1. Before further examination is performed for the selected spatial motion prediction candidate, it may be determined whether the merge list already contains a maximum number of spatial motion prediction candidates. Hence, the prediction list modifier 363 compares 502 the number of spatial motion prediction candidates in the merge list with the maximum number, and if the number of spatial motion prediction candidates in the merge list is not less than the maximum number, the selected spatial motion prediction candidate is not included in the merge list and the process of constructing the merge list can be stopped 526. On the other hand, if the number of spatial motion prediction candidates in the merge list is less than the maximum number, a further analyses of the selected spatial motion prediction candidate is performed (blocks 504-522).

For all the spatial motion prediction candidates for which the further analyses is to be performed, some or all of the following conditions below may be tested for determining whether to include the spatial motion prediction candidate in the merge list.

The prediction list modifier 363 examines 504 if the prediction unit or block covering the spatial motion prediction candidate block is not available for motion prediction. If so, the candidate is not included in the merge list. The reason that the block is not available may be that the block is either coded in intra mode or resides in a different slice or outside of the picture area.

In addition to the common conditions above, for each spatial motion prediction candidate, if any of the following conditions holds, then the candidate is not included in the merge list, otherwise, it is included.

Figure 10A:
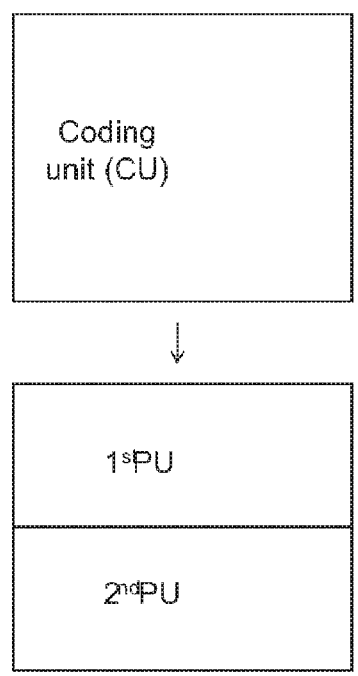
FIG. 10a illustrates an example of a horizontal division of the coding unit.
Figure 10B:
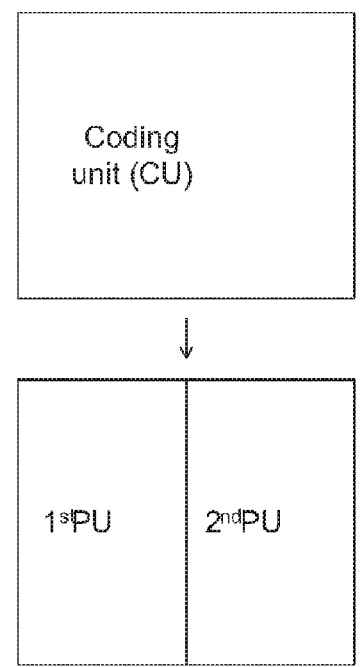
FIG. 10b illustrates an example of a vertical division of the coding unit.
Figure 11A:
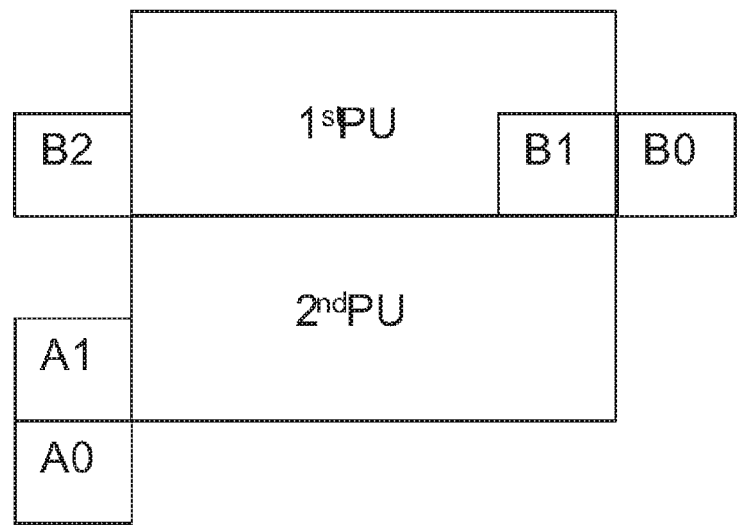
FIG. 11a illustrates locations of five spatial neighbours A0, A1, B0, B1, B2 for a prediction unit generated as the second prediction unit of a horizontally divided coding unit.
Figure 11B:
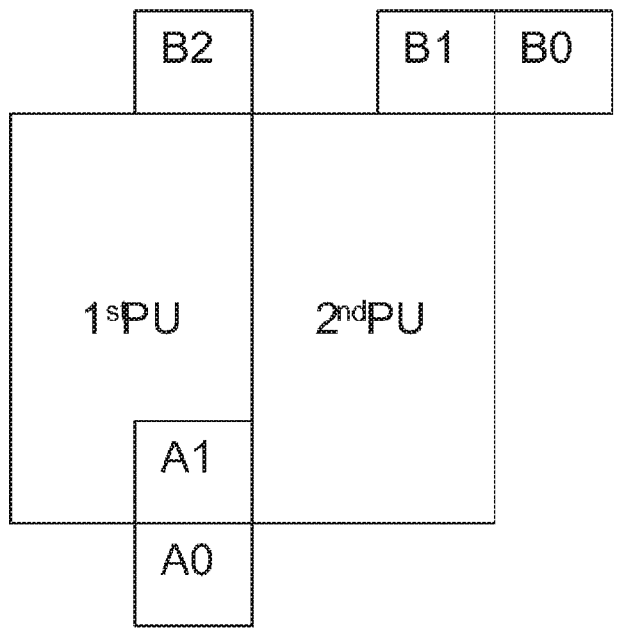
FIG. 11b illustrates locations of five spatial neighbours for a prediction unit generated as the second prediction unit of a vertically divided coding unit.

The prediction list modifier 363 determines 506 which spatial motion prediction candidate of the set of spatial motion prediction candidates is in question. If the spatial motion prediction candidate is the block A1, one or more of the following conditions may be examined 508, 510 to determine whether to include this spatial motion prediction candidate in the merge list or not. If the current coding unit 100 is vertically split into two rectangle prediction units 103, 104 as depicted in FIG. 10b and the current prediction unit is the second prediction unit 104 in the coding/decoding order (508), this spatial motion prediction candidate is not included in the merge list. If the current coding unit 100 is not vertically split into two rectangle prediction units but it is horizontally split into two rectangle prediction units 101, 102 as depicted in FIG. 10a and the current prediction unit is the second prediction unit in the coding/decoding order and the block A1 has the same motion information as the block B1 (510), this spatial motion prediction candidate (block A1) is not included in the merge list. In the example of FIG. 10a the second prediction unit is the lower prediction unit 102 of the coding unit 100 and in the example of FIG. 10b the second prediction unit is the rightmost prediction unit 104 of the coding unit 100. If none of the conditions above is fulfilled the block A1 is included in the merge list as a spatial motion prediction candidate (524).

If the spatial motion prediction candidate is the block B1, one or more of the following conditions may be examined 512, 514 to determine whether to include this spatial motion prediction candidate in the merge list or not. If the current coding unit 100 is horizontally split into two rectangle prediction units 101, 102 as depicted in FIG. 10a and the current prediction unit is the second prediction unit 104 in the coding/decoding order (512), this spatial motion prediction candidate is not included in the merge list. If the current coding unit 100 is not horizontally split into two rectangle prediction units and if the block B1 has the same motion information than the block A1 (514), this spatial motion prediction candidate (block B1) is not included in the merge list. If none of the conditions above is fulfilled the block B1 is included in the merge list as a spatial motion prediction candidate (524).

If the spatial motion prediction candidate is the block B0, this spatial motion prediction candidate is not included in the merge list if the block B0 has the same motion information than the block B1 (516). Otherwise, if the number of spatial motion prediction candidates in the merge list is less than the maximum number of spatial motion prediction candidates, this spatial motion prediction candidate (block B0) is included in the merge list (524).

If the spatial motion prediction candidate is the block A0, this spatial motion prediction candidate is not included in the merge list if the block A0 has the same motion information than the block A1 (518). Otherwise, if the number of spatial motion prediction candidates in the merge list is less than the maximum number of spatial motion prediction candidates, this spatial motion prediction candidate (block A0) is included in the merge list (524).

If the spatial motion prediction candidate is the block B2, this spatial motion prediction candidate is not included in the merge list if the maximum number of spatial motion prediction candidates is four and the other blocks A0, A1, B0, and B1 are all decided to be included in the merge list (520). Otherwise, if the number of spatial motion prediction candidates in the merge list is less than the maximum number of spatial motion prediction candidates, the block B2 is not included in the merge list if the block B2 has the same motion information than the block B1 or the block A1 (522).

Then, after processing the blocks A1, B1, B0, A0 and B2 and including a subset of them in the merge list based on the above described conditions, no more redundancy check between these candidates are performed and remaining temporal motion prediction candidate and/or other possible additional candidates may be processed.

Comparing two blocks whether they have the same motion may be performed by comparing all the elements of the motion information, namely 1) The information whether 'the prediction unit is uni-predicted using only reference picture list0' or 'the prediction unit is un-predicted using only reference picture list1' or 'the prediction unit is bi-predicted using both reference picture list0 and list1' 2) Motion vector value corresponding to the reference picture list0 3) Reference picture index in the reference picture list0 4) Motion vector value corresponding to the reference picture list1 5) Reference picture index in the reference picture list1.

In some embodiments similar restrictions for comparing candidate pairs can be applied if the current coding unit is coded/decoded by splitting into four or any number of prediction units.

The maximum number of merge list candidates can be any non-zero value. In the example above the merger list candidates were the spatial neighbour blocks A0, A1, B0, B1, B2 and the temporal motion prediction candidate, but there may be more than one temporal motion prediction candidate and also other spatial motion prediction candidates than the spatial neighbour blocks. In some embodiments there may also be other spatial neighbour blocks than the blocks A0, A1, B0, B1, B2.

It is also possible that the maximum number of spatial motion prediction candidates included in the list can be different than four.

In some embodiments the maximum number of merge list candidates and maximum number of spatial motion prediction candidates included in the list can depend on whether a temporal motion vector candidate is included in the list or not.

A different number of spatial motion prediction candidates located at various locations in the current frame can be processed. The locations can be the same as or different than A1, B1, B0, A0 and B2.

The decision of including which spatial motion prediction candidates in the list can be realized in two steps. In the first step, some of the candidates are eliminated by checking whether the candidate block is available and/or the candidate block's prediction mode is intra and/or whether the current block is a second prediction unit of a coding unit coded with two prediction units and the candidate has the same motion with the first prediction unit. In the second step, remaining candidates are examined and some or all of them are included in the merge list. The examination in the second step does not include comparing motion information of each possible candidate pair but includes a subset of the possible comparison combinations.

The decisions for the candidates can be taken in any order of A1, B1, B0, A0 and B2 or independently in parallel.

For each candidate and/or a subset of the candidates, the following conditions may also be checked: Whether the candidate block has the same motion as the first prediction unit of the current coding unit when the current coding unit is split into two rectangle prediction units and the current prediction unit is the second prediction unit in the coding/decoding order.

Additional conditions related to various properties of current and/or previous slices and/or current and/or neighbour blocks can be utilized for determining whether to include a candidate in the list.

Motion comparison can be realized by comparing a subset of the whole motion information. For example, only the motion vector values for some or all reference picture lists and/or reference indices for some or all reference picture lists and/or an identifier value assigned to each block to represent its motion information can be compared. The comparison can be an identicality or an equivalence check or comparing the (absolute) difference against a threshold or any other similarity metric.

Conditions for deciding whether a candidate is to be included in the list can include motion information comparison with any subset of the candidates as long as not all possible candidate pairs are compared eventually.

Deciding whether a temporal motion vector candidate is to be included in the list can be based on comparing its motion information with motion information of a subset of the spatial motion vector prediction candidates.

Figure 12:
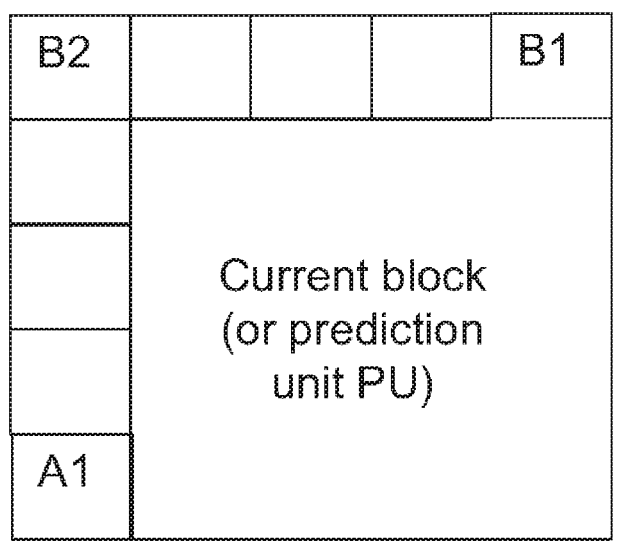
FIG. 12 illustrates an example of blocks between some spatial neighbours of a coding unit.

When comparing motion information of two blocks, motion information of additional blocks can be considered too. For example, when comparing the block B2 and the block A1, all the blocks between the block B2 and the block A1 (illustrated in FIG. 12) are checked whether they have the same motion; and when comparing the block B2 and the block B1, all the blocks between the block B2 and the block B1 (illustrated in FIG. 12) are checked whether they have the same motion. This embodiment can be implemented so that the right-most block of each prediction unit or all blocks of each prediction unit may store the information of how many consecutive blocks to the above have the same motion information. Also the bottom-most block of each prediction unit or all blocks of each prediction unit may store the information of how many consecutive blocks to the left have the same motion information. Using this information the condition for not including B0 in the list can be realized by checking if the number of consecutive blocks with the same motion to the left of B0 is greater than 0. The condition for not including A0 in the list can be realized by checking if the number of consecutive blocks with same motion to the above of A0 is greater than 0. The conditions for not including B2 can be modified as follows:

It is not examined whether the block B2 has same motion as the block B1 or whether the block B2 has same motion as the block A1, but how many consecutive blocks exists to the left of the block B1 with the same motion than the block B1 and/or how many consecutive blocks exist above the block A1 with the same motion. If the number of consecutive blocks with the same motion to the left of the block B1 is greater than the number of blocks between B2 and B1, or if the number of consecutive blocks with the same motion above the block A1 is greater than the number of blocks between the block B2 and the block A1, the block B2 is not included in the merge list.

If the above implementation is used, the value of how many consecutive blocks to the left/above have the same motion information can be determined by direct comparison of motion information or checking the prediction mode and/or the merge index if the block employs a merge process.

When coding/decoding the selected merge index, the information whether the merge process is employed for coding/decoding a Skip mode coding unit or an Inter Merge mode prediction unit can be taken into account. For example, if a context adaptive binary arithmetic coder (CABAC) is used for entropy coding/decoding, different contexts can be used for the bins depending on the coding mode (Skip mode or inter merge mode) of the current block. Furthermore, assigning two contexts depending on whether the merge process is employed in a Skip mode coding unit or an inter Merge mode prediction unit can be applied for only the most significant bin of the merge index.

During the process of removal of redundant candidates, comparison between motion vector predictor candidates can also be based on any other information than the motion vector values. For example, it can be based on linear or non-linear functions of motion vector values, coding or prediction types of the blocks used to obtain the motion information, block size, the spatial location in the frame/(largest) coding unit/macroblock, the information whether blocks share the same motion with a block, the information whether blocks are in the same coding/prediction unit, etc.

The following pseudo code illustrates an example embodiment of the invention for constructing the merging list.

Inputs to this process are a luma location (xP, yP) specifying the top-left luma sample of the current prediction unit relative to the top-left sample of the current picture;

variables specifying the width and the height of the prediction unit for luma, nPSW and nPSH; and a variable PartIdx specifying the index of the current prediction unit within the current coding unit.

Outputs of this process are (with N being replaced by $A_0$, $A_1$, $B_0$, $B_1$ or $B_2$ and with X being replaced by 0 or 1)

the availability flags availableFlagN of the neighbouring prediction units, the reference indices refIdxLXN of the neighbouring prediction units, the prediction list utilization flags predFlagLXN of the neighbouring prediction units, the motion vectors mvLXN of the neighbouring prediction units.

For the derivation of availableFlagN, with N being $A_0$, $A_1$, $B_0$, $B_1$ or $B_2$ and (xN, yN) being (xP−1, yP+nPSH), (xP−1, yP+nPSH−1), (xP+nPSW, yP−1), (xP+nPSW−1, yP−1) or (xP−1, yP−1), the following applies.

If one of the following conditions is true, the availableFlagN is set equal to 0, both components mvLXN are set equal to 0, refIdxLXN and predFlagLX[xN, yN] of the prediction unit covering luma location (xN, yN) are assigned respectively to mvLXN, refIdxLXN and predFlagLXN.

N is equal to $B_2$ and availableFlag$A_0$+availableFlag$A_1$+availableFlag$B_0$+availableFlag$B_1$ is equal to 4.

The prediction unit covering luma location (xN, yN) is not available or PredMode is MODE_INTRA.

N is equal to A1 and PartMode of the current prediction unit is PART_N×2N or PART_nL×2N or PART_nR×2N and PartIdx is equal to 1.

N is equal to A1 and PartMode of the current prediction unit is PART_2N×N or PART_2N×nU or PART_2N×nD and PartIdx is equal to 1 and the prediction units covering luma location (xP+nPSW−1, yP−1) (N=B1) and luma location (xN, yN) (Cand. N) have identical motion parameters:
mvLX[xP+nPSW−1, yP−1]==mvLX[xN, yN]
refIdxLX[xP+nPSW−1, yP−1]==refIdxLX[xN, yN]
predFlagLX[xP+nPSW−1, yP−1]==predFlagLX[xN, yN]

N is equal to B1 and PartMode of the current prediction unit is 2N×N or PART_2N×nU or PART_2N×nD and PartIdx is equal to 1.

N is equal to B1 and the prediction units covering luma location (xP−1, yP+nPSH−1) (N=A1) and luma location (xN, yN) (Cand. N) have identical motion parameters:
mvLX[xP−1, yP+nPSH−1]==mvLX[xN, yN]
refIdxLX[xP−1, yP+nPSH−1]==refIdxLX[xN, yN]
predFlagLX[xP−1, yP+nPSH−1]==predFlagLX[xN, yN]

N is equal to B0 and the prediction units covering luma location (xP+nPSW−1, yP−1) (N=B1) and luma location (xN, yN) (Cand. N) have identical motion parameters:
mvLX[xP+nPSW−1, yP−1]==mvLX[xN, yN]
refIdxLX[xP+nPSW−1, yP−1]==refIdxLX[xN, yN]
predFlagLX[xP+nPSW−1, yP−1]==predFlagLX[xN, yN]

N is equal to A0 and the prediction units covering luma location (xP−1, yP+nPSH−1) (N=A1) and luma location (xN, yN) (Cand. N) have identical motion parameters:
mvLX[xP−1, yP+nPSH−1]==mvLX[xN, yN]
refIdxLX[xP−1, yP+nPSH−1]==refIdxLX[xN, yN]
predFlagLX[xP−1, yP+nPSH−1]==predFlagLX[xN, yN]

N is equal to B2 and the prediction units covering luma location (xP+nPSW−1, yP−1) (N=B1) and luma location (xN, yN) (Cand. N) have identical motion parameters:
mvLX[xP+nPSW−1, yP−1]==mvLX[xN, yN]
refIdxLX[xP+nPSW−1, yP−1]==refIdxLX[xN, yN]
predFlagLX[xP+nPSW−1, yP−1]==predFlagLX[xN, yN]

N is equal to B2 and the prediction units covering luma location (xP−1, yP+nPSH−1) (N=A1) and luma location (xN, yN) (Cand. N) have identical motion parameters:
mvLX[xP−1, yP+nPSH−1]==mvLX[xN, yN]
refIdxLX[xP−1, yP+nPSH−1]==refIdxLX[xN, yN]
predFlagLX[xP−1, yP+nPSH−1]==predFlagLX[xN, yN]

PartMode of the current prediction unit is PART_N×N and PartIdx is equal to 3 and the prediction units covering luma location (xP−1, yP) (PartIdx=2) and luma location (xP−1, yP−1) (PartIdx=0) have identical motion parameters:
mvLX[xP−1, yP]==mvLX[xP−1, yP−1]
refIdxLX[xP−1, yP]==refIdxLX[xP−1, yP−1]
predFlagLX[xP−1, yP]==predFlagLX[xP−1, yP−1]
and the prediction units covering luma location (xP, yP−1) (PartIdx=1) and luma location (xN, yN) (Cand. N) have identical motion parameters:
mvLX[xP, yP−1]==mvLX[xN, yN]
refIdxLX[xP, yP−1]==refIdxLX[xN, yN]
predFlagLX[xP, yP−1]==predFlagLX[xN, yN]

PartMode of the current prediction unit is PART_N×N and PartIdx is equal to 3 and the prediction units covering luma location (xP, yP−1) (PartIdx=1) and luma location (xP−1, yP−1) (PartIdx=0) have identical motion parameters:
mvLX[xP, yP−1]==mvLX[xP−1, yP−1]
refIdxLX[xP, yP−1]==refIdxLX[xP−1, yP−1]
predFlagLX[xP, yP−1]==predFlagLX[xP−1, yP−1]
and the prediction units covering luma location (xP−1, yP) (PartIdx=2) and luma location (xN, yN) (Cand. N) have identical motion parameters:
mvLX[xP−1, yP]==mvLX[xN, yN]
refIdxLX[xP−1, yP]==refIdxLX[xN, yN]
predFlagLX[xP−1, yP]==predFlagLX[xN, yN]

Otherwise, availableFlagN is set equal to 1 and the variables mvLX[xN, yN], refIdxLX[xN, yN] and predFlagLX[xN, yN] of the prediction unit covering luma location (xN, yN) are assigned respectively to mvLXN, refIdxLXN and predFlagLXN.

For the motion vector predictor candidate list generation process, each list candidate can include more information than the motion vector value, such as the reference lists used, the reference frames used in each list and motion vector for each list.

When all motion vector candidates have been examined, one motion vector is selected to be used as the motion vector for the current block. The motion vector selector 364 may examine different motion vectors in the list and determine which motion vector provides the most efficient encoding result, or the selection of the motion vector may be based on to other criteria as well. Information of the selected motion vector is provided for the mode selector for encoding and transmission to the decoder or for storage when the mode selector determines to use inter prediction for the current block. The information may include the index of the motion vector in the list, and/or motion vector parameters or other appropriate information.

The selected motion vector and the block relating to the motion vector is used to generate the prediction representation of the image block 312 which is provided as the output of the mode selector. The output may be used by the first summing device 321 to produce the first prediction error signal 320, as was described above.

The selected motion vector predictor candidate can be modified by adding a motion vector difference or can be used directly as the motion vector of the block. Moreover, after the motion compensation is performed by using the selected motion vector predictor candidate, the residual signal of the block can be transform coded or skipped to be coded.

Although the embodiments above have been described with respect to the size of the macroblock being 16×16 pixels, it would be appreciated that the methods and apparatus described may be configured to handle macroblocks of different pixel sizes.

Figure 7:
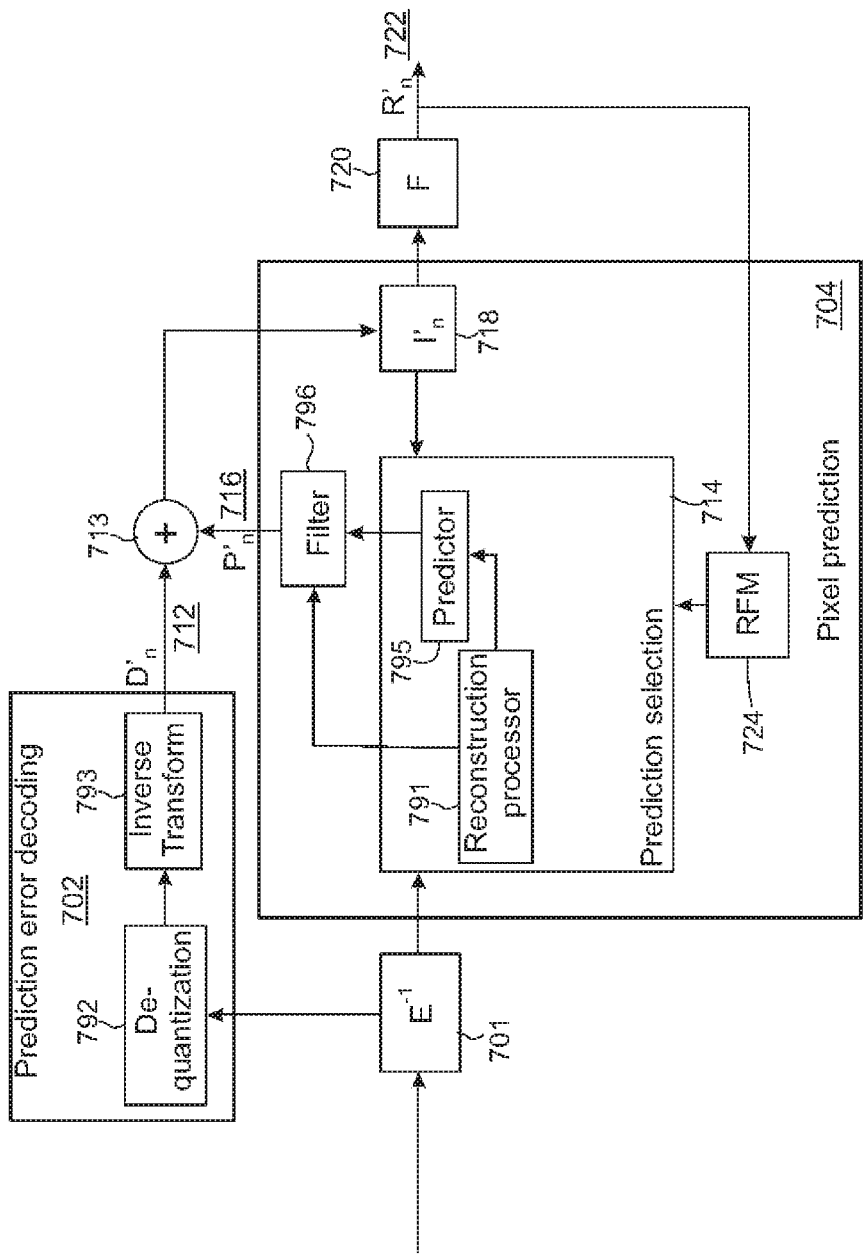
FIG. 7 shows schematically an embodiment of the invention as incorporated within a decoder.

In the following the operation of an example embodiment of the decoder 600 is depicted in more detail with reference to FIG. 7.

Figure 8A:
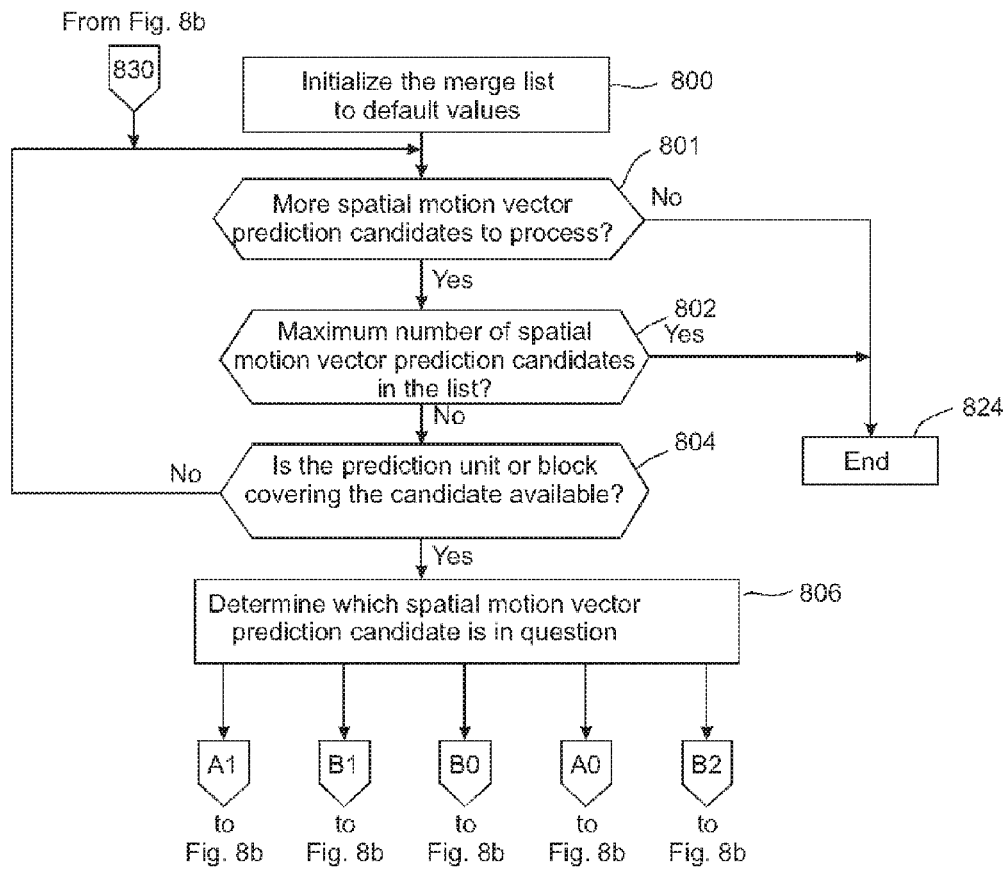
FIGS. 8a and 8b show a flow diagram of showing the operation of an embodiment of the invention with respect to the decoder shown in FIG. 7.
Figure 8B:
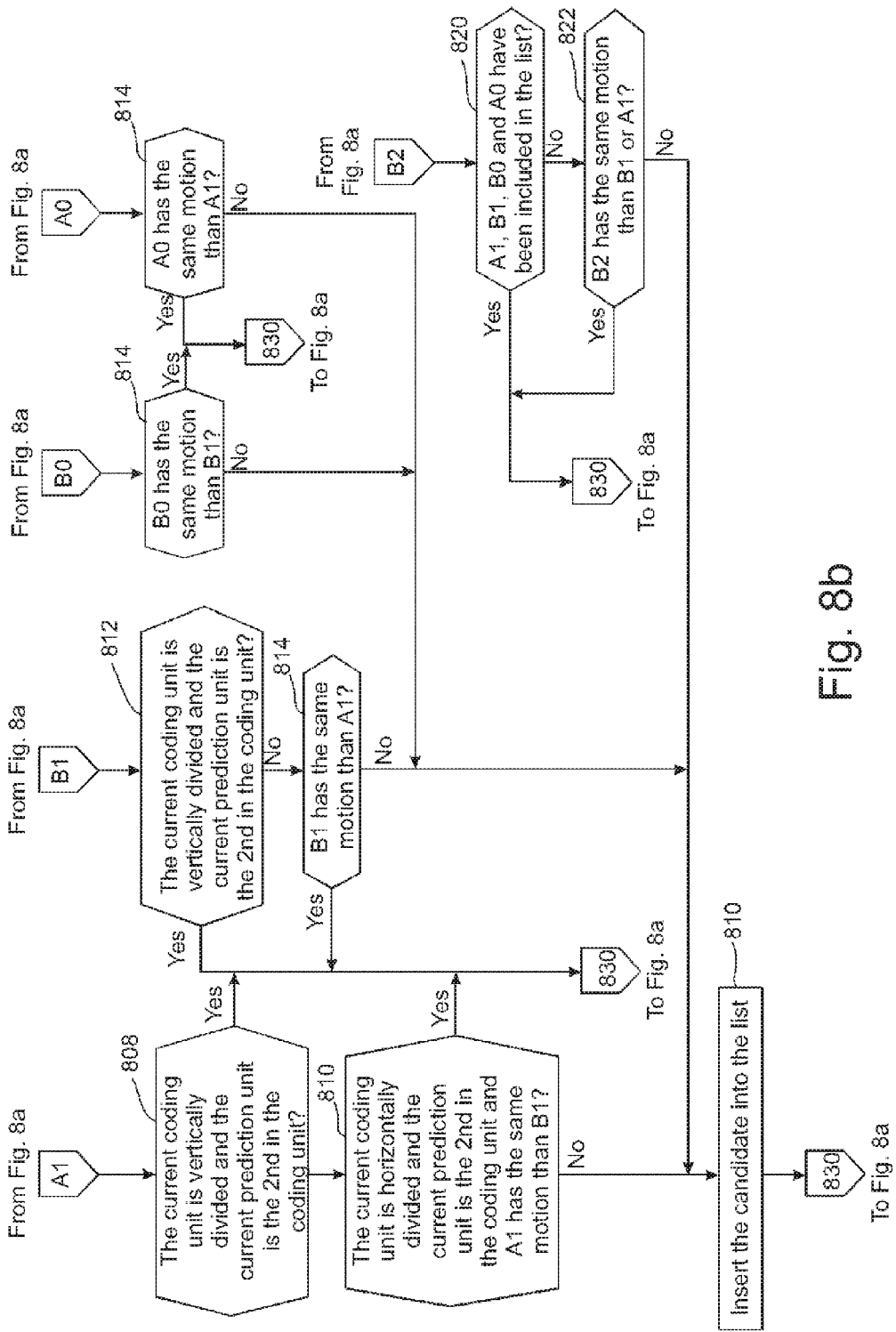

At the decoder side similar operations are performed to reconstruct the image blocks. FIG. 7 shows a block diagram of a video decoder 700 suitable for employing embodiments of the invention and FIGS. 8a and 8b show a flow diagram of an example of a method in the video decoder. The bitstream to be decoded may be received from the encoder, from a network element, from a storage medium or from another source. The decoder is aware of the structure of the bitstream so that it can determine the meaning of the entropy coded codewords and may decode the bitstream by an entropy decoder 701 which performs entropy decoding on the received signal. The entropy decoder thus performs the inverse operation to the entropy encoder 330 of the encoder described above. The entropy decoder 701 outputs the results of the entropy decoding to a prediction error decoder 702 and a pixel predictor 704.

In some embodiments the entropy coding may not be used but another channel encoding may be in use, or the encoded bitstream may be provided to the decoder 700 without channel encoding. The decoder 700 may comprise a corresponding channel decoder to obtain the encoded codewords from the received signal.

The pixel predictor 704 receives the output of the entropy decoder 701. The output of the entropy decoder 701 may include an indication on the prediction mode used in encoding the current block. A predictor selector 714 within the pixel predictor 704 determines that an intra-prediction or an inter-prediction is to be carried out. The predictor selector 714 may furthermore output a predicted representation of an image block 716 to a first combiner 713. The predicted representation of the image block 716 is used in conjunction with the reconstructed prediction error signal 712 to generate a preliminary reconstructed image 718. The preliminary reconstructed image 718 may be used in the predictor 714 or may be passed to a filter 720. The filter 720, if used, applies a filtering which outputs a final reconstructed signal 722. The final reconstructed signal 722 may be stored in a reference frame memory 724, the reference frame memory 724 further being connected to the predictor 714 for prediction operations.

Also the prediction error decoder 702 receives the output of the entropy decoder 701. A dequantizer 792 of the prediction error decoder 702 may dequantize the output of the entropy decoder 701 and the inverse transform block 793 may perform an inverse transform operation to the dequantized signal output by the dequantizer 792. The output of the entropy decoder 701 may also indicate that prediction error signal is not to be applied and in this case the prediction error decoder produces an all zero output signal.

The decoder selects the 16×16 pixel residual macroblock to reconstruct. This residual macroblock is also called as a current block.

The decoder may receive information on the encoding mode used in encoding of the current block. The indication is decoded, when necessary, and provided to the reconstruction processor 791 of the prediction selector 714. The reconstruction processor 791 examines the indication and selects one of the intra-prediction mode(s), if the indication indicates that the block has been encoded using intra-prediction, or the inter-prediction mode, if the indication indicates that the block has been encoded using inter-prediction.

For inter-prediction mode the reconstruction processor 791 may comprise one or more elements corresponding to the prediction processor 362 of the encoder, such as a motion vector definer, a prediction list modifier and/or a motion vector selector.

The reconstruction processor 791 initializes a motion vector prediction list to default values in block 800. As was the case in the encoding part, in this example the spatial motion prediction candidates are the spatial neighbour blocks A0, A1, B0, B1, B2 and these spatial motion prediction candidates are processed in the same predetermined order than in the encoder: A1, B1, B0, A0 and B2. The first spatial motion prediction candidate to be selected for further examination is thus A1. Before further examination is performed for the selected spatial motion prediction candidate, it is examined whether the merge list already contains a maximum number of spatial motion prediction candidates. If the number of spatial motion prediction candidates in the merge list is not less than the maximum number, the selected spatial motion prediction candidate is not included in the merge list and the process of constructing the merge list can be stopped 826. On the other hand, if the number of spatial motion prediction candidates in the merge list is less than the maximum number, a further analyses of the selected spatial motion prediction candidate is performed (blocks 804-822).

The decoder examines 804 if the prediction unit or block covering the spatial motion prediction candidate block is not available for motion prediction. If so, the candidate is not included in the merge list. The reason that the block is not available may be that the block is either coded in intra mode or resides in a different slice or outside of the picture area.

In addition to the common conditions above, for each spatial motion prediction candidate, if any of the following conditions holds, then the candidate is not included in the merge list, otherwise, it is included.

The decoder determines 806 which spatial motion prediction candidate of the set of spatial motion prediction candidates is in question. If the spatial motion prediction candidate is the block A1, one or more of the following conditions may be examined 808, 810 to determine whether to include this spatial motion prediction candidate in the merge list or not. If the current coding unit 100 is vertically split into two rectangle prediction units 103, 104 as depicted in FIG. 10b and the current prediction unit is the second prediction unit 104 in the coding/decoding order (808), this spatial motion prediction candidate is not included in the merge list. If the current coding unit 100 is not vertically split into two rectangle prediction units but it is horizontally split into two rectangle prediction units 101, 102 as depicted in FIG. 10a and the current prediction unit is the second prediction unit in the coding/decoding order and the block A1 has the same motion information as the block B1 (810), this spatial motion prediction candidate (block A1) is not included in the merge list. In the example of FIG. 10a the second prediction unit is the lower prediction unit 102 of the coding unit 100 and in the example of FIG. 10b the second prediction unit is the rightmost prediction unit 104 of the coding unit 100. If none of the conditions above is fulfilled the block A1 is included in the merge list as a spatial motion prediction candidate (824).

If the spatial motion prediction candidate is the block B1, one or more of the following conditions may be examined 812, 814 to determine whether to include this spatial motion prediction candidate in the merge list or not. If the current coding unit 100 is horizontally split into two rectangle prediction units 101, 102 as depicted in FIG. 10a and the current prediction unit is the second prediction unit 104 in the coding/decoding order (812), this spatial motion prediction candidate is not included in the merge list. If the current coding unit 100 is not horizontally split into two rectangle prediction units and if the block B1 has the same motion information than the block A1 (814), this spatial motion prediction candidate (block B1) is not included in the merge list. If none of the conditions above is fulfilled the block B1 is included in the merge list as a spatial motion prediction candidate (824).

If the spatial motion prediction candidate is the block B0, this spatial motion prediction candidate is not included in the merge list if the block B0 has the same motion information than the block B1 (816). Otherwise, if the number of spatial motion prediction candidates in the merge list is less than the maximum number of spatial motion prediction candidates, this spatial motion prediction candidate (block B0) is included in the merge list (824).

If the spatial motion prediction candidate is the block A0, this spatial motion prediction candidate is not included in the merge list if the block A0 has the same motion information than the block A1 (818). Otherwise, if the number of spatial motion prediction candidates in the merge list is less than the maximum number of spatial motion prediction candidates, this spatial motion prediction candidate (block A0) is included in the merge list (824).

If the spatial motion prediction candidate is the block B2, this spatial motion prediction candidate is not included in the merge list if the maximum number of spatial motion prediction candidates is four and the other blocks A0, A1, B0, and B1 are all decided to be included in the merge list (820). Otherwise, if the number of spatial motion prediction candidates in the merge list is less than the maximum number of spatial motion prediction candidates, the block B2 is not included in the merge list if the block B2 has the same motion information than the block B1 or the block A1 (822).

Then, after processing the blocks A1, B1, B0, A0 and B2 and including a subset of them in the merge list based on the above described conditions, no more redundancy check between these candidates are performed and remaining temporal motion prediction candidate and/or other possible additional candidates may be processed.

When the merge list has been constructed the decoder may use 828 the indication of the motion vector received from the encoder to select the motion vector for decoding the current block. The indication may be, for example, an index to the merge list.

Basically, after the reconstruction processor 791 has constructed the merge list, it would correspond with the merge list constructed by the encoder if the reconstruction processor 791 has the same information available than the encoder had. If some information has been lost during transmission the information from the encoder to the decoder, it may affect the generation of the merge list in the decoder 700.

The above examples describe the operation mainly in the merge mode but the encoder and decoder may also operate in other modes.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore in some embodiments of the invention the coder and decoder may share some or all common elements.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above.

It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi core processor architecture, as non limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In the following some examples will be provided.

In some embodiments a method comprises:

receiving a block of pixels including a prediction unit; determining a set of spatial motion vector prediction candidates for the block of pixels; the spatial motion vector prediction candidates being provided with motion information;

selecting a first spatial motion vector prediction candidate from the set of spatial motion vector prediction candidates as a potential spatial motion vector prediction candidate to be included in a merge list for the prediction unit;

determining a subset of spatial motion vector predictions based on the location of the block associated with the first spatial motion vector prediction candidate;

comparing motion information of the first spatial motion vector prediction candidate with motion information of the spatial motion vector prediction candidate in the determined subset of spatial motion vector prediction candidates;

if at least one of the comparisons indicates that the motion vector information of the spatial motion vector prediction candidates correspond with each other, excluding the first spatial motion vector prediction candidate from the merge list.

In some embodiments the method comprises including neighbouring blocks of the received block of pixels in the set of spatial motion vector prediction candidates.

In some embodiments the method comprises constructing the set of spatial motion vector predictions by using motion vectors of one or more encoded blocks in a same frame than the block of pixels.

In some embodiments the method comprises selecting spatial motion vector prediction candidates from the set of spatial motion vector prediction candidates as the potential spatial motion vector prediction candidate in a predetermined order.

In some embodiments the method comprises comparing motion information of the potential spatial motion vector prediction candidate with motion information of at most one other spatial motion vector prediction candidate of the set of spatial motion vector prediction candidates.

In some embodiments the method comprises prediction unit and a second prediction unit; and if so, excluding the potential spatial motion vector prediction candidate from the merge list if the prediction unit is the second prediction unit.

In some embodiments the method comprises determining a maximum number of spatial motion vector prediction candidates to be included in a merge list; and limiting the number of spatial motion vector prediction candidates in the merge list smaller or equal to the maximum number.

In some embodiments the method comprises examining, if the number of spatial motion vector prediction candidates in the merge list smaller than the maximum number;

if so, examining whether a prediction unit to which the potential spatial motion vector prediction candidate belongs is available for motion prediction;

if so, performing at least one of the following:

for the potential spatial motion vector prediction candidate on the left side of the prediction unit, excluding the potential spatial motion vector prediction candidate from the merge list if any of the following conditions are fulfilled:

the received block of pixels is vertically divided into a first prediction unit and a second prediction unit, and the prediction unit is the second prediction unit;

the received block of pixels is horizontally divided into a first prediction unit and a second prediction unit, and if the prediction unit is the second prediction unit, and the potential spatial motion vector prediction candidate has essentially similar motion information than the spatial motion vector prediction candidate above the prediction unit;

for the potential spatial motion vector prediction candidate above the prediction unit, excluding the potential spatial motion vector prediction candidate from the merge list if any of the following conditions are fulfilled:

the received block of pixels is horizontally divided into a first prediction unit and a second prediction unit, and the prediction unit is the second prediction unit;

the potential spatial motion vector prediction candidate has essentially similar motion information than the spatial motion vector prediction candidate on the left side of the prediction unit;

for the potential spatial motion vector prediction candidate, which is on the right side of the potential spatial motion vector prediction candidate above the prediction unit, excluding the potential spatial motion vector prediction candidate from the merge list if the potential spatial motion vector prediction candidate has essentially similar motion information than the spatial motion vector prediction candidate above the prediction unit;

for the potential spatial motion vector prediction candidate, which is below the potential spatial motion vector prediction candidate on the left side of the prediction unit, excluding the potential spatial motion vector prediction candidate from the merge list if the potential spatial motion vector prediction candidate has essentially similar motion information than the spatial motion vector prediction candidate on the left side of the prediction unit;

for the potential spatial motion vector prediction candidate cornerwise neighbouring the prediction unit, excluding the potential spatial motion vector prediction candidate from the merge list if any of the following conditions are fulfilled:

all the other potential spatial motion vector prediction candidates have been included in the merge list;

the potential spatial motion vector prediction candidate has essentially similar motion information than the spatial motion vector prediction candidate above the prediction unit;

the potential spatial motion vector prediction candidate has essentially similar motion information than the spatial motion vector prediction candidate on the left side of the prediction unit.

In some embodiments the method comprises including a temporal motion prediction candidate into the merge list.

In some embodiments the method comprises selecting one motion vector prediction candidate from the merge list to represent a motion vector prediction for the block of pixels.

In some embodiments a method according to the second aspect comprises:

receiving an encoded block of pixels including a prediction unit;

determining a set of spatial motion vector prediction candidates for the encoded block of pixels; the spatial motion vector prediction candidates being provided with motion information;

selecting a first spatial motion vector prediction candidate from the set of spatial motion vector prediction candidates as a potential spatial motion vector prediction candidate to be included in a merge list for the prediction unit;

determining a subset of spatial motion vector predictions based on the location of the block associated with the first spatial motion vector prediction candidate;

comparing motion information of the first spatial motion vector prediction candidate with motion information of another spatial motion vector prediction candidate of the set of spatial motion vector prediction candidates;

if at least one of the comparisons indicates that the motion vector information of the spatial motion vector prediction candidates correspond with each other, excluding the first spatial motion vector prediction candidate from the merge list.

In some embodiments the method comprises including neighbouring blocks of the received encoded block of pixels in the set of spatial motion vector prediction candidates.

In some embodiments the method comprises constructing the set of spatial motion vector predictions by using motion vectors of one or more decoded blocks in a same frame than the received encoded block of pixels.

In some embodiments the method comprises selecting spatial motion vector prediction candidates from the set of spatial motion vector prediction candidates as the potential spatial motion vector prediction candidate in a predetermined order.

In some embodiments the method comprises comparing motion information of the potential spatial motion vector prediction candidate with motion information of at most one other spatial motion vector prediction candidate of the set of spatial motion vector prediction candidates.

In some embodiments the method comprises examining whether the received encoded block of pixels is divided into a first prediction unit and a second prediction unit; and if so, excluding the potential spatial motion vector prediction candidate from the merge list if the prediction unit is the second prediction unit.

In some embodiments the method comprises
determining a maximum number of spatial motion vector prediction candidates to be included in a merge list; and
limiting the number of spatial motion vector prediction candidates in the merge list smaller or equal to the maximum number.

In some embodiments the method comprises
examining, if the number of spatial motion vector prediction candidates in the merge list smaller than the maximum number;

if so, examining whether a prediction unit to which the potential spatial motion vector prediction candidate belongs is available for motion prediction;

if so, performing at least one of the following:

for the potential spatial motion vector prediction candidate on the left side of the prediction unit, excluding the potential spatial motion vector prediction candidate from the merge list if any of the following conditions are fulfilled:

the received encoded block of pixels is vertically divided into a first prediction unit and a second prediction unit, and the prediction unit is the second prediction unit;

the received encoded block of pixels is horizontally divided into a first prediction unit and a second prediction unit, and if the prediction unit is the second prediction unit, and the potential spatial motion vector prediction candidate has essentially similar motion information than the spatial motion vector prediction candidate above the prediction unit;

for the potential spatial motion vector prediction candidate above the prediction unit, excluding the potential spatial motion vector prediction candidate from the merge list if any of the following conditions are fulfilled:

the received encoded block of pixels is horizontally divided into a first prediction unit and a second prediction unit, and the prediction unit is the second prediction unit;

the potential spatial motion vector prediction candidate has essentially similar motion information than the spatial motion vector prediction candidate on the left side of the prediction unit;

for the potential spatial motion vector prediction candidate, which is on the right side of the potential spatial motion vector prediction candidate above the prediction unit, excluding the potential spatial motion vector prediction candidate from the merge list if the potential spatial motion vector prediction candidate has essentially similar motion information than the spatial motion vector prediction candidate above the prediction unit;

for the potential spatial motion vector prediction candidate, which is below the potential spatial motion vector prediction candidate on the left side of the prediction unit, excluding the potential spatial motion vector prediction candidate from the merge list if the potential spatial motion vector prediction candidate has essentially similar motion information than the spatial motion vector prediction candidate on the left side of the prediction unit;

for the potential spatial motion vector prediction candidate cornerwise neighbouring the prediction unit, excluding the potential spatial motion vector prediction candidate from the merge list if any of the following conditions are fulfilled:

all the other potential spatial motion vector prediction candidates have been included in the merge list;

the potential spatial motion vector prediction candidate has essentially similar motion information than the spatial motion vector prediction candidate above the prediction unit;

the potential spatial motion vector prediction candidate has essentially similar motion information than the spatial motion vector prediction candidate on the left side of the prediction unit.

In some embodiments the method comprises including a temporal motion prediction candidate into the merge list.

In some embodiments the method comprises selecting one motion vector prediction candidate from the merge list to represent a motion vector prediction for the received encoded block of pixels.

In some embodiments an apparatus according to the third aspect comprises a processor and a memory including computer program code, the memory and the computer program code configured to, with the processor, cause the apparatus to:
  receive a block of pixels including a prediction unit;
  determining a set of spatial motion vector prediction candidates for the block of pixels; the spatial motion vector prediction candidates being provided with motion information;
  selecting a first spatial motion vector prediction candidate from the set of spatial motion vector prediction candidates as a potential spatial motion vector prediction candidate to be included in a merge list for the prediction unit;
  determining a subset of spatial motion vector predictions based on the location of the block associated with the first spatial motion vector prediction candidate;
  comparing motion information of the first spatial motion vector prediction candidate with motion information of the spatial motion vector prediction candidate in the determined subset of spatial motion vector prediction candidates;
  if at least one the comparisons indicates that the motion vector information of the spatial motion vector prediction candidates correspond with each other, excluding the first spatial motion vector prediction candidate from the merge list.

In some embodiments an apparatus according to the fourth aspect comprises a processor and a memory including computer program code, the memory and the computer program code configured to, with the processor, cause the apparatus to:
  receive an encoded block of pixels including a prediction unit;
  determine a set of spatial motion vector prediction candidates for the encoded block of pixels; the spatial motion vector prediction candidates being provided with motion information;
  select a first spatial motion vector prediction candidate from the set of spatial motion vector prediction candidates as a potential spatial motion vector prediction candidate to be included in a merge list for the prediction unit;
  determine a subset of spatial motion vector predictions based on the location of the block associated with the first spatial motion vector prediction candidate;
  compare motion information of the first spatial motion vector prediction candidate with motion information of the spatial motion vector prediction candidate in the determined subset of spatial motion vector prediction candidates;
  exclude the first spatial motion vector prediction candidate from the merge list, if at least one of the comparisons indicates that the motion vector information of the spatial motion vector prediction candidates correspond with each other In some embodiments a storage medium having stored thereon a computer program code a computer executable program code for use by an encoder, said program codes comprise instructions for use by an encoder, said program code comprises instructions for:
  receiving a block of pixels including a prediction unit;
  determining a set of spatial motion vector prediction candidates for the block of pixels; the spatial motion vector prediction candidates being provided with motion information;
  selecting a first spatial motion vector prediction candidate from the set of spatial motion vector prediction candidates as a potential spatial motion vector prediction candidate to be included in a merge list for the prediction unit;
  determining a subset of spatial motion vector predictions based on the location of the block associated with the first spatial motion vector prediction candidate;
  comparing motion information of the first spatial motion vector prediction candidate with motion information of the spatial motion vector prediction candidate in the determined subset of spatial motion vector prediction candidates;
  if at least one of the comparisons indicates that the motion vector information of the spatial motion vector prediction candidates correspond with each other, excluding the first spatial motion vector prediction candidate from the merge list.

In some embodiments a storage medium having stored thereon a computer program code a computer executable program code for use by an encoder, said program codes comprise instructions for use by an encoder, said program code comprises instructions for:
  receiving an encoded block of pixels including a prediction unit;
  determining a set of spatial motion vector prediction candidates for the encoded block of pixels; the spatial motion vector prediction candidates being provided with motion information;
  selecting a first spatial motion vector prediction candidate from the set of spatial motion vector prediction candidates as a potential spatial motion vector prediction candidate to be included in a merge list for the prediction unit;
  determining a subset of spatial motion vector predictions based on the location of the block associated with the first spatial motion vector prediction candidate;
  comparing motion information of the first spatial motion vector prediction candidate with motion information of the spatial motion vector prediction candidate in the determined subset of spatial motion vector prediction candidates;
  if at least one of the comparisons indicates that the motion vector information of the spatial motion vector prediction candidates correspond with each other, excluding the first spatial motion vector prediction candidate from the merge list.

In some embodiments an apparatus comprises:
  means for receiving a block of pixels including a prediction unit;
  means for selecting a first spatial motion vector prediction candidate from the set of spatial motion vector prediction candidates as a potential spatial motion vector prediction candidate to be included in a merge list for the prediction unit;
  means for determining a subset of spatial motion vector predictions based on the location of the block associated with the first spatial motion vector prediction candidate;
  means for comparing motion information of the first spatial motion vector prediction candidate with motion information of the spatial motion vector prediction candidate in the determined subset of spatial motion vector prediction candidates;
  means for excluding the first spatial motion vector prediction candidate from the merge list, if at least one of the comparisons indicates that the motion vector information of the spatial motion vector prediction candidates correspond with each other.

In some embodiments an apparatus comprises:
  means for receiving an encoded block of pixels including a prediction unit;
  means for determining a set of spatial motion vector prediction candidates for the encoded block of pixels; the spatial motion vector prediction candidates being provided with motion information;

means for selecting a first spatial motion vector prediction candidate from the set of spatial motion vector prediction candidates as a potential spatial motion vector prediction candidate to be included in a merge list for the prediction unit;
means for determining a subset of spatial motion vector predictions based on the location of the block associated with the first spatial motion vector prediction candidate;
means for comparing motion information of the first spatial motion vector prediction candidate with motion information of the spatial motion vector prediction candidate in the determined subset of spatial motion vector prediction candidates;
means for excluding the first spatial motion vector prediction candidate from the merge list, if at least one of the comparisons indicates that the motion vector information of the spatial motion vector prediction candidates correspond with each other.

The invention claimed is:
1. A method comprising:
  determining a set of spatial motion vector prediction candidates for a block of pixels, the spatial motion vector prediction candidates being provided with motion information;
  selecting a first spatial motion vector prediction candidate from the set of spatial motion vector prediction candidates as a potential spatial motion vector prediction candidate to be included in a merge list for a prediction unit of the block of pixels, where the merge list is constructed based on the motion information of the spatial motion vector prediction candidates and is utilized to identify motion vector prediction candidates of which one spatial motion vector prediction candidate from the merge list is signaled as the motion information for the prediction unit;
  determining a subset of spatial motion vector prediction candidates based on a location of the block associated with the first spatial motion vector prediction candidate;
  comparing motion information of the first spatial motion vector prediction candidate with motion information of spatial motion vector prediction candidates in the determined subset of spatial motion vector prediction candidates without making a comparison of each possible candidate pair from the set of spatial motion vector prediction candidates, wherein comparing comprises performing an equivalence check or comparing a difference in motion information to a threshold or other similarity metric; and
  causing information identifying the one spatial motion vector prediction candidate from the merge list to be transmitted to a decoder or to be stored.
2. The method according to claim 1 further comprising selecting spatial motion vector prediction candidates from the set of spatial motion vector prediction candidates as the potential spatial motion vector prediction candidate in a predetermined order.
3. The method according to claim 1, further comprising comparing motion information of the potential spatial motion vector prediction candidate with motion information of at most one other spatial motion vector prediction candidate of the set of spatial motion vector prediction candidates.
4. The method according to claim 1 further comprising examining whether the block of pixels is divided into a first prediction unit and a second prediction unit; and if so, excluding the potential spatial motion vector prediction candidate from the merge list if the prediction unit is the second prediction unit.
5. The method according to claim 1, further comprising determining a maximum number of spatial motion vector prediction candidates to be included in the merge list; and
limiting the number of spatial motion vector prediction candidates in the merge list smaller or equal to the maximum number.
6. The method according to claim 5 comprising:
examining, if the number of spatial motion vector prediction candidates in the merge list smaller than the maximum number;
if so, examining whether the prediction unit to which the potential spatial motion vector prediction candidate belongs is available for motion prediction;
if so, performing at least one of the following:
for a potential spatial motion vector prediction candidate on a left side of the prediction unit, excluding the potential spatial motion vector prediction candidate from the merge list if any of the following conditions are fulfilled:
  the received block of pixels is vertically divided into a first prediction unit and a second prediction unit;
  the received block of pixels is horizontally divided into a first prediction unit and a second prediction unit, and if the prediction unit is the second prediction unit, and the potential spatial motion vector prediction candidate has essentially similar motion information than a spatial motion vector prediction candidate above the prediction unit;
for a potential spatial motion vector prediction candidate above the prediction unit, excluding the potential spatial motion vector prediction candidate from the merge list if any of the following conditions are fulfilled:
  the received block of pixels is horizontally divided into a first prediction unit and a second prediction unit, and the prediction unit is the second prediction unit;
  the potential spatial motion vector prediction candidate has essentially similar motion information than the spatial motion vector prediction candidate on the left side of the prediction unit;
for a potential spatial motion vector prediction candidate, which is on a right side of the potential spatial motion vector prediction candidate above the prediction unit, excluding the potential spatial motion vector prediction candidate from the merge list if the potential spatial motion vector prediction candidate has essentially similar motion information than the spatial motion vector prediction candidate above the prediction unit;
for a potential spatial motion vector prediction candidate, which is below the potential spatial motion vector prediction candidate on the left side of the prediction unit, excluding the potential spatial motion vector prediction candidate from the merge list if the potential spatial motion vector prediction candidate has essentially similar motion information than the spatial motion vector prediction candidate on the left side of the prediction unit;
for a potential spatial motion vector prediction candidate cornerwise neighbouring the prediction unit, excluding the potential spatial motion vector prediction candidate from the merge list if any of the following conditions are fulfilled:
  all the other potential spatial motion vector prediction candidates have been included in the merge list;

the potential spatial motion vector prediction candidate has essentially similar motion information than the spatial motion vector prediction candidate above the prediction unit;

the potential spatial motion vector prediction candidate has essentially similar motion information than the spatial motion vector prediction candidate on the left side of the prediction unit.

7. The method according to claim 1 further comprising including a temporal motion prediction candidate into the merge list.

8. The method according to claim 1 further comprising selecting one motion vector prediction candidate from the merge list to represent a motion vector prediction for the block of pixels.

9. A method comprising:
determining a set of spatial motion vector prediction candidates for an encoded block of pixels, the spatial motion vector prediction candidates being provided with motion information;
selecting a first spatial motion vector prediction candidate from the set of spatial motion vector prediction candidates as a potential spatial motion vector prediction candidate to be included in a merge list for a prediction unit of the encoded block of pixels, where the merge list is constructed based on the motion information of the spatial motion vector prediction candidates;
determining a subset of spatial motion vector prediction candidates based on the location of the block associated with the first spatial motion vector prediction candidate;
comparing motion information of the first spatial motion vector prediction candidate with motion information of another spatial motion vector prediction candidate of the set of spatial motion vector prediction candidates without making a comparison of each possible candidate pair from the set of spatial motion vector prediction candidates, wherein comparing comprises performing an equivalence check or comparing a difference in motion information to a threshold or other similarity metric; and
selecting a spatial motion vector prediction candidate from the merge list for use in decoding the encoded block of pixels, wherein the spatial motion vector prediction candidate is selected from the merge list using information that was received identifying a respective spatial motion vector prediction candidate from the merge list constructed by an encoder.

10. The method according to claim 9 further comprising comparing motion information of the potential spatial motion vector prediction candidate with motion information of at most one other spatial motion vector prediction candidate of the set of spatial motion vector prediction candidates.

11. The method according to claim 9 further comprising examining whether the received encoded block of pixels is divided into a first prediction unit and a second prediction unit; and if so, excluding the potential spatial motion vector prediction candidate from the merge list if the prediction unit is the second prediction unit.

12. The method according to claim 9 further comprising determining a maximum number of spatial motion vector prediction candidates to be included in the merge list; and
limiting the number of spatial motion vector prediction candidates in the merge list smaller or equal to the maximum number.

13. The method according to claim 12 further comprising:
examining, if the number of spatial motion vector prediction candidates in the merge list smaller than the maximum number;
if so, examining whether the prediction unit to which the potential spatial motion vector prediction candidate belongs is available for motion prediction;
if so, performing at least one of the following:
for a potential spatial motion vector prediction candidate on a left side of the prediction unit, excluding the potential spatial motion vector prediction candidate from the merge list if any of the following conditions are fulfilled:
the received encoded block of pixels is vertically divided into a first prediction unit and a second prediction unit;
the received encoded block of pixels is horizontally divided into a first prediction unit and a second prediction unit, and if the prediction unit is the second prediction unit, and the potential spatial motion vector prediction candidate has essentially similar motion information than a spatial motion vector prediction candidate above the prediction unit;
for a potential spatial motion vector prediction candidate above the prediction unit, excluding the potential spatial motion vector prediction candidate from the merge list if any of the following conditions are fulfilled:
the received encoded block of pixels is horizontally divided into a first prediction unit and a second prediction unit, and the prediction unit is the second prediction unit;
the potential spatial motion vector prediction candidate has essentially similar motion information than the spatial motion vector prediction candidate on the left side of the prediction unit;
for a potential spatial motion vector prediction candidate, which is on a right side of the potential spatial motion vector prediction candidate above the prediction unit, excluding the potential spatial motion vector prediction candidate from the merge list if the potential spatial motion vector prediction candidate has essentially similar motion information than the spatial motion vector prediction candidate above the prediction unit;
for a potential spatial motion vector prediction candidate, which is below the potential spatial motion vector prediction candidate on the left side of the prediction unit, excluding the potential spatial motion vector prediction candidate from the merge list if the potential spatial motion vector prediction candidate has essentially similar motion information than the spatial motion vector prediction candidate on the left side of the prediction unit; and
for a potential spatial motion vector prediction candidate cornerwise neighbouring the prediction unit, excluding the potential spatial motion vector prediction candidate from the merge list if any of the following conditions are fulfilled:
all the other potential spatial motion vector prediction candidates have been included in the merge list;
the potential spatial motion vector prediction candidate has essentially similar motion information than the spatial motion vector prediction candidate above the prediction unit;
the potential spatial motion vector prediction candidate has essentially similar motion information than the spatial motion vector prediction candidate on the left side of the prediction unit.

14. The method according to claim 9 further comprising selecting one motion vector prediction candidate from the merge list to represent a motion vector prediction for the encoded block of pixels.

15. An apparatus comprising a processor and a memory including computer program code, the memory and the computer program code configured to, with the processor, cause the apparatus to:
  determine a set of spatial motion vector prediction candidates for a block of pixels, the spatial motion vector prediction candidates being provided with motion information;
  select a first spatial motion vector prediction candidate from the set of spatial motion vector prediction candidates as a potential spatial motion vector prediction candidate to be included in a merge list for a prediction unit of the block of pixels, where the merge list is constructed based on the motion information of the spatial motion vector prediction candidates and is utilized to identify motion vector prediction candidates of which one spatial motion vector prediction candidate from the merge list is signaled as the motion information for the prediction unit;
  determine a subset of spatial motion vector prediction candidates based on the location of the block associated with the first spatial motion vector prediction candidate;
  compare motion information of the first spatial motion vector prediction candidate with motion information of the spatial motion vector prediction candidate in the determined subset of spatial motion vector prediction candidates without making a comparison of each possible candidate pair from the set of spatial motion vector prediction candidates, wherein comparing comprises performing an equivalence check or comparing a difference in motion information to a threshold or other similarity metric; and
  cause information identifying the one spatial motion vector prediction candidate from the merge list to be transmitted to a decoder or to be stored.

16. The apparatus according to claim 15 wherein the apparatus is further caused to select spatial motion vector prediction candidates from the set of spatial motion vector prediction candidates as the potential spatial motion vector prediction candidate in a predetermined order.

17. The apparatus according to claim 15, wherein the apparatus is further caused to compare motion information of the potential spatial motion vector prediction candidate with motion information of at most one other spatial motion vector prediction candidate of the set of spatial motion vector prediction candidates.

18. The apparatus according to claim 15 wherein the apparatus is further caused to examine whether the block of pixels is divided into a first prediction unit and a second prediction unit; and if so, exclude the potential spatial motion vector prediction candidate from the merge list if the prediction unit is the second prediction unit.

19. The apparatus according to claim 15, wherein the apparatus is further caused to:
  determine a maximum number of spatial motion vector prediction candidates to be included in the merge list; and
  limit the number of spatial motion vector prediction candidates in the merge list smaller or equal to the maximum number.

20. The apparatus according to claim 19 wherein the apparatus is further caused to:
  examine, if the number of spatial motion vector prediction candidates in the merge list smaller than the maximum number;
  if so, examine whether the prediction unit to which the potential spatial motion vector prediction candidate belongs is available for motion prediction;
  if so, perform at least one of the following:
  for a potential spatial motion vector prediction candidate on a left side of the prediction unit, exclude the potential spatial motion vector prediction candidate from the merge list if any of the following conditions are fulfilled:
    the received block of pixels is vertically divided into a first prediction unit and a second prediction unit;
    the received block of pixels is horizontally divided into a first prediction unit and a second prediction unit, and if the prediction unit is the second prediction unit, and the potential spatial motion vector prediction candidate has essentially similar motion information than a spatial motion vector prediction candidate above the prediction unit;
  for a potential spatial motion vector prediction candidate above the prediction unit, exclude the potential spatial motion vector prediction candidate from the merge list if any of the following conditions are fulfilled:
    the received block of pixels is horizontally divided into a first prediction unit and a second prediction unit, and the prediction unit is the second prediction unit;
    the potential spatial motion vector prediction candidate has essentially similar motion information than the spatial motion vector prediction candidate on the left side of the prediction unit;
  for a potential spatial motion vector prediction candidate, which is on a right side of the potential spatial motion vector prediction candidate above the prediction unit, exclude the potential spatial motion vector prediction candidate from the merge list if the potential spatial motion vector prediction candidate has essentially similar motion information than the spatial motion vector prediction candidate above the prediction unit;
  for a potential spatial motion vector prediction candidate, which is below the potential spatial motion vector prediction candidate on the left side of the prediction unit, exclude the potential spatial motion vector prediction candidate from the merge list if the potential spatial motion vector prediction candidate has essentially similar motion information than the spatial motion vector prediction candidate on the left side of the prediction unit;
  for a potential spatial motion vector prediction candidate cornerwise neighbouring the prediction unit, exclude the potential spatial motion vector prediction candidate from the merge list if any of the following conditions are fulfilled:
    all the other potential spatial motion vector prediction candidates have been included in the merge list;
    the potential spatial motion vector prediction candidate has essentially similar motion information than the spatial motion vector prediction candidate above the prediction unit;
    the potential spatial motion vector prediction candidate has essentially similar motion information than the spatial motion vector prediction candidate on the left side of the prediction unit.

21. The apparatus according to claim 15 wherein the apparatus is further caused to include a temporal motion prediction candidate into the merge list.

22. The apparatus according to claim 15 wherein the apparatus is further caused to select one motion vector prediction candidate from the merge list to represent a motion vector prediction for the block of pixels.

23. An apparatus comprising a processor and a memory including computer program code, the memory and the computer program code configured to, with the processor, cause the apparatus to:
- determine a set of spatial motion vector prediction candidates for an encoded block of pixels, the spatial motion vector prediction candidates being provided with motion information;
- select a first spatial motion vector prediction candidate from the set of spatial motion vector prediction candidates as a potential spatial motion vector prediction candidate to be included in a merge list for a prediction unit of the encoded block of pixels, where the merge list is constructed based on the motion information of the spatial motion vector prediction candidates;
- determine a subset of spatial motion vector prediction candidates based on the location of the block associated with the first spatial motion vector prediction candidate;
- compare motion information of the first spatial motion vector prediction candidate with motion information of the spatial motion vector prediction candidate in the determined subset of spatial motion vector prediction candidates without making a comparison of each possible candidate pair from the set of spatial motion vector prediction candidates, wherein comparing comprises performing an equivalence check or comparing a difference in motion information to a threshold or other similarity metric; and
- select a spatial motion vector prediction candidate from the merge list for use in decoding the encoded block of pixels, wherein the spatial motion vector prediction candidate is selected from the merge list using information that was received identifying a respective spatial motion vector prediction candidate from the merge list constructed by an encoder.

24. The apparatus according to claim 23 wherein the apparatus is further caused to compare motion information of the potential spatial motion vector prediction candidate with motion information of at most one other spatial motion vector prediction candidate of the set of spatial motion vector prediction candidates.

25. The apparatus according to claim 23 wherein the apparatus is further caused to examine whether the received encoded block of pixels is divided into a first prediction unit and a second prediction unit; and if so, exclude the potential spatial motion vector prediction candidate from the merge list if the prediction unit is the second prediction unit.

26. The apparatus according to claim 23 wherein the apparatus is further caused to:
- determine a maximum number of spatial motion vector prediction candidates to be included in the merge list; and
- limit the number of spatial motion vector prediction candidates in the merge list smaller or equal to the maximum number.

27. The apparatus according to claim 26 wherein the apparatus is further caused to:
- examine if the number of spatial motion vector prediction candidates in the merge list smaller than the maximum number;
- if so, examine whether the prediction unit to which the potential spatial motion vector prediction candidate belongs is available for motion prediction;
- if so, perform at least one of the following:
- for a potential spatial motion vector prediction candidate on a left side of the prediction unit, exclude the potential spatial motion vector prediction candidate from the merge list if any of the following conditions are fulfilled:
  - the received encoded block of pixels is vertically divided into a first prediction unit and a second prediction unit;
  - the received encoded block of pixels is horizontally divided into a first prediction unit and a second prediction unit, and if the prediction unit is the second prediction unit, and the potential spatial motion vector prediction candidate has essentially similar motion information than a spatial motion vector prediction candidate above the prediction unit;
- for a potential spatial motion vector prediction candidate above the prediction unit, exclude the potential spatial motion vector prediction candidate from the merge list if any of the following conditions are fulfilled:
  - the received encoded block of pixels is horizontally divided into a first prediction unit and a second prediction unit, and the prediction unit is the second prediction unit;
  - the potential spatial motion vector prediction candidate has essentially similar motion information than the spatial motion vector prediction candidate on the left side of the prediction unit;
- for a potential spatial motion vector prediction candidate, which is on a right side of the potential spatial motion vector prediction candidate above the prediction unit, exclude the potential spatial motion vector prediction candidate from the merge list if the potential spatial motion vector prediction candidate has essentially similar motion information than the spatial motion vector prediction candidate above the prediction unit;
- for a potential spatial motion vector prediction candidate, which is below the potential spatial motion vector prediction candidate on the left side of the prediction unit, exclude the potential spatial motion vector prediction candidate from the merge list if the potential spatial motion vector prediction candidate has essentially similar motion information than the spatial motion vector prediction candidate on the left side of the prediction unit; and
- for a potential spatial motion vector prediction candidate cornerwise neighbouring the prediction unit, exclude the potential spatial motion vector prediction candidate from the merge list if any of the following conditions are fulfilled:
  - all the other potential spatial motion vector prediction candidates have been included in the merge list;
  - the potential spatial motion vector prediction candidate has essentially similar motion information than the spatial motion vector prediction candidate above the prediction unit;
  - the potential spatial motion vector prediction candidate has essentially similar motion information than the spatial motion vector prediction candidate on the left side of the prediction unit.

28. The apparatus according to claim 23 wherein the apparatus is further caused to select one motion vector prediction candidate from the merge list to represent a motion vector prediction for the received encoded block of pixels.

29. A non-transitory computer readable medium having stored thereon a computer executable program code for use by an encoder, said program codes comprising instructions for:

determining a set of spatial motion vector prediction candidates for a block of pixels, the spatial motion vector prediction candidates being provided with motion information;

selecting a first spatial motion vector prediction candidate from the set of spatial motion vector prediction candidates as a potential spatial motion vector prediction candidate to be included in a merge list for a prediction unit of the block of pixels, where the merge list is constructed based on the motion information of the spatial motion vector prediction candidates and is utilized to identify motion vector prediction candidates of which one spatial motion vector prediction candidate from the merge list is signaled as the motion information for the prediction unit;

determining a subset of spatial motion vector prediction candidates based on the location of the block associated with the first spatial motion vector prediction candidate;

comparing motion information of the first spatial motion vector prediction candidate with motion information of the spatial motion vector prediction candidate in the determined subset of spatial motion vector prediction candidates without making a comparison of each possible candidate pair from the set of spatial motion vector prediction candidates, wherein comparing comprises performing an equivalence check or comparing a difference in motion information to a threshold or other similarity metric; and causing information identifying the one spatial motion vector prediction candidate from the merge list to be transmitted to a decoder or to be stored.

30. A non-transitory computer readable medium having stored thereon a computer executable program code for use by an encoder, said program codes comprising instructions for:

determining a set of spatial motion vector prediction candidates for an encoded block of pixels, the spatial motion vector prediction candidates being provided with motion information;

selecting a first spatial motion vector prediction candidate from the set of spatial motion vector prediction candidates as a potential spatial motion vector prediction candidate to be included in a merge list for a prediction unit of the encoded block of pixels, where the merge list is constructed based on the motion information of the spatial motion vector prediction candidates;

determining a subset of spatial motion vector prediction candidates based on the location of the block associated with the first spatial motion vector prediction candidate;

comparing motion information of the first spatial motion vector prediction candidate with motion information of the spatial motion vector prediction candidate in the determined subset of spatial motion vector prediction candidates without making a comparison of each possible candidate pair from the set of spatial motion vector prediction candidates, wherein comparing comprises performing an equivalence check or comparing a difference in motion information to a threshold or other similarity metric; and selecting a spatial motion vector prediction candidate from the merge list for use in decoding the encoded block of pixels, wherein the spatial motion vector prediction candidate is selected from the merge list using information that was received identifying a respective spatial motion vector prediction candidate from the merge list constructed by an encoder.

\* \* \* \* \*

UNITED STATES PATENT AND TRADEMARK OFFICE
CERTIFICATE OF CORRECTION

PATENT NO. : 9,743,105 B2
APPLICATION NO. : 15/426822
DATED : August 22, 2017
INVENTOR(S) : Bici et al.

Page 1 of 1

It is certified that error appears in the above-identified patent and that said Letters Patent is hereby corrected as shown below:

In the Claims

<u>Column 33,</u>
Line 35, Claim 9, "set" should read --subset--.

Signed and Sealed this
Twenty-third Day of October, 2018

Andrei Iancu
*Director of the United States Patent and Trademark Office*